Figure 1:
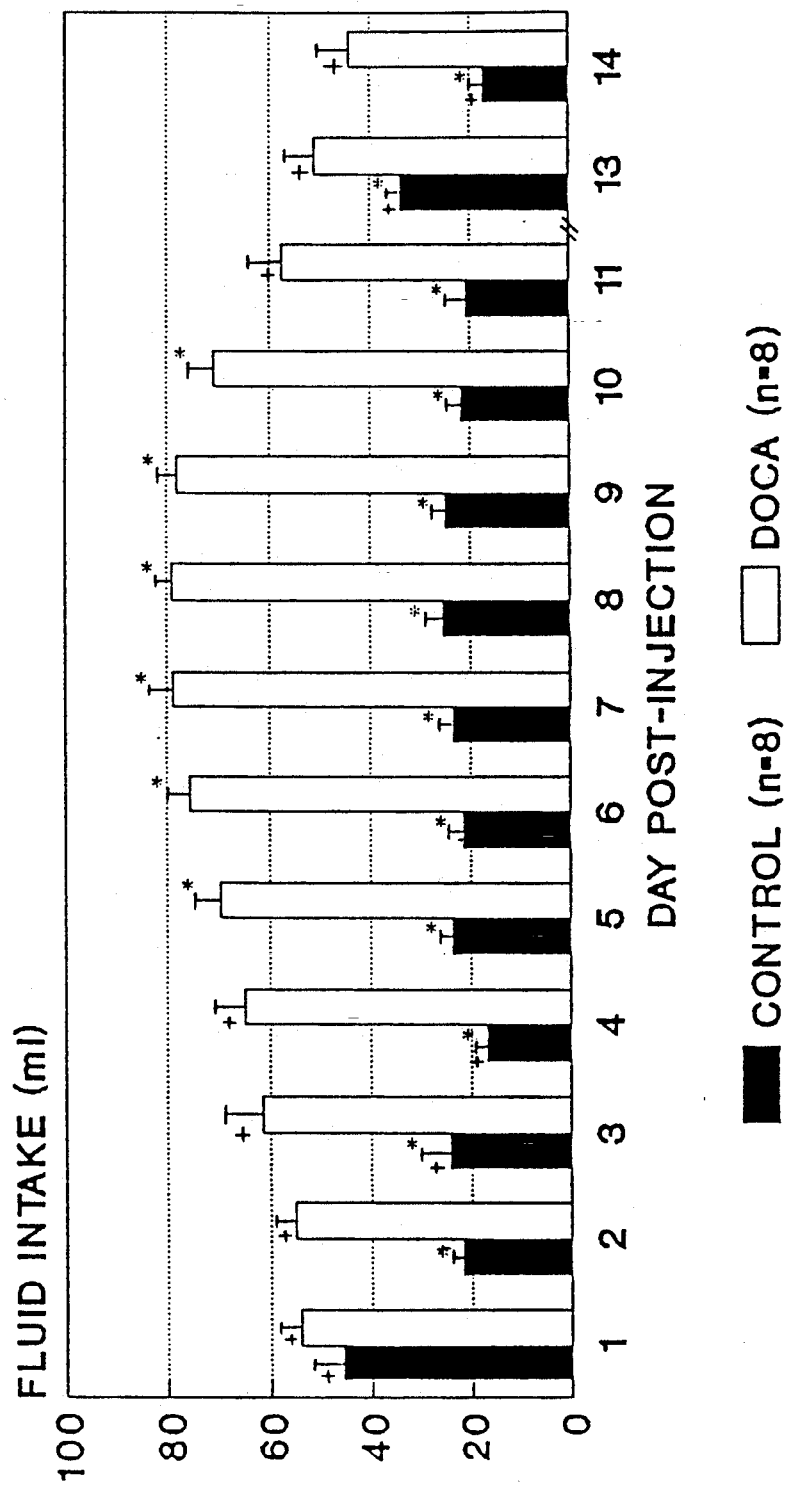

United States Patent [19]

Locke et al.

[11] Patent Number: 5,260,091

[45] Date of Patent: Nov. 9, 1993

[54] SALT TASTE ENHANCERS

[75] Inventors: Kenneth W. Locke, Burlington, Mass.; Stuart Fielding, Morris Plains, N.J.

[73] Assignee: Interneuron Pharmaceuticals Inc., Lexington, Mass.

[21] Appl. No.: 964,328

[22] Filed: Oct. 21, 1992

[51] Int. Cl.$^5$ ............................................. A23L 1/237
[52] U.S. Cl. ................................. 426/649; 426/537
[58] Field of Search ................................ 426/537, 649

[56] References Cited

U.S. PATENT DOCUMENTS 5,206,049  5/1993  Fielding et al. ..................... 426/649

OTHER PUBLICATIONS

Heck et al., "Salt Taste Transduction Occurs Through an Amilordie-Sensitive Sodium Pathway", *Science* 223: 403-404 (1984).

*Primary Examiner*—Joseph Golian
*Attorney, Agent, or Firm*—Pennie & Edmonds

[57] ABSTRACT

Compositions that are effective as salt substitutes and enhancers comprise novel mixtures of sodium chloride and derivatives of amiloride, indanyloxyacetic acid, or anthranilic acid. The present invention provides for a method of enhancing the saltiness of edible materials by the addition of the above-mentioned derivatives. The present invention further provides for a method of imparting saltiness to, or enhancing saltiness of, edible materials by the administration or use of the above-mentioned derivatives in lieu of the higher levels of sodium chloride that would be required if sodium chloride were being used alone.

15 Claims, 15 Drawing Sheets

SALT TASTE ENHANCERS

1. FIELD OF INVENTION

The present invention is directed to the use of derivatives of amiloride, indanyloxyacetic acid, and anthranilic acid as salt or sodium chloride (NaCl) substitutes and enhancers. The invention covers compositions that are effective as salt substitutes and enhancers which comprise novel mixtures of sodium chloride and the above-mentioned compounds. An embodiment of the invention covers a method of enhancing the saltiness of edible materials by the addition of the above-mentioned compounds. Another embodiment of the invention is directed to imparting saltiness to, or enhancing the saltiness of, edible materials by the administration or use of the above-mentioned compounds in lieu of the higher levels of sodium chloride that would be required if sodium chloride were being used alone.

2. BACKGROUND OF THE INVENTION

Sodium chloride (salt, NaCl) is essential for human growth and survival. Estimates of the minimum daily intake of sodium that is necessary for growth range from 0.1 to 0.5 g (0.254 g to 1.27 g salt) (Frahk, R. L. and Mickelsen, O. "Sodium—potassium chloride mixtures as table salt." *Amer. J. Clin. Nutr.* 4:467–470, 1969; Subcommittee on the Tenth Edition of the RDA's—Food and Nutrition Board National Research Council, Recommended Dietary Allowances. 10th ed., Washington, D.C.: National Academy Press, 1989). An intake of 0.5 g of sodium per day can compensate for urinary, fecal and dermal losses in adults, allowing for wide variations in physical activity and climate. (Subcommittee on the Tenth Edition of the RDA's—Food and Nutrition Board National Research Council, Recommended Dietary Allowances. 10th ed., Washington, D.C.: National Academy Press, 1989). This relatively low requirement for salt is largely the result of strong evolutionary physiological mechanisms developed by most mammals for sodium conservation.

Sodium in the diet is derived from a number of sources. Sodium occurs naturally in foods. It is added to food during processing (non-discretionary use), and is added at the table (discretionary use). In the current Western diet, sodium occurring naturally in foods only contributes about 10% of dietary sodium, while that added during processing contributes up to 75%. Discretionary sodium adds the remaining 15%. (Sanchez-Castillo, C. P., Warrender, S., Whitehead, T. D. and James, W. P. I. "An assessment of the sources of dietary salt in a British population." *Clin. Science* 72:95–102, 1987). Additional dietary sodium comes from drinking water, water softeners and drugs (i.e., antacids). (Fregley, M. J. "Sodium and potassium." *Ann. Rev. Nutr.* 1:69–93, 1981).

2.1. THE PROBLEMS WHICH ARE SOLVED BY THE CURRENT INVENTION

The ingestion of salt in most societies far exceeds levels considered necessary and safe. Salt intake has risen throughout the world to between 6 and 23 g per day. (MacGregor, G. A. "Salt and hypertension." *Br. J. Clin. Pharmacol* 21:1235–1285, 1986). In the United States, most adults consume between 4 and 6 g of sodium (10.2 to 15.2 g salt) each day. (Fregley, M. J. "Sodium and potassium." *Ann. Rev. Nutr.* 1:69–93, 1981; U S. Department of Health and Human Services, The Surgeon General's Report on Nutrition and Health, Public Health Service. Washington, D.C.: DHHS Publication No. 88-50210, 1988). Based on surveys of individual sodium intake, the U.S. Surgeon General's Office reported that the minimum sodium intake of women aged 20–49 was 2.4 g (6.1 g salt). (U.S. Department of Health and Human Services, The Surgeon General's Report on Nutrition and Health, Public Health Service. Washington, D.C.: DHHS Publication No. 88-50210, 1988). The value determined for males aged 12–49 was 3.3 g sodium (8.4 g salt). These estimates do not include discretionary sodium intake or sodium contributed by additional sources (i.e., drinking water).

Concern about the intake of salt comes primarily from the beneficial effects of salt restriction in patients suffering from a variety of diseases. (Frank, R. L. and Mickelsen, O. "Sodium—potassium chloride mixtures as table salt." *Amer. J. Clin. Nutr.* 4:467–470, 1969). The benefits of this type of therapy have led investigators to suggest a causal relationship between high salt intake and the condition being treated (i.e., Dahl, L. K. and Love, R. A. "Evidence for a relationship between sodium (chloride) intake and human essential hypertension." *Arch. Intern. Med.* 94:525–531, 1954). Salt restriction has been employed for the treatment of edematous heart disease, congestive heart failure, hypertension, renal disease, cirrhosis of the liver, toxemias of pregnancy and Meniere's disease. (Frank, R. L. and Mickelsen, O. "Sodium—potassium chloride mixtures as table salt." *Amer. J. Clin. Nutr.* 4:467–470, 1969). Of these conditions, the relationship between salt intake and hypertension has been the most thoroughly investigated.

The conviction that salt intake above some arbitrary level causes essential hypertension goes back to 2000 B.C. (Dustan, H. P. and Kirk, K. A. "Corcoran lecture: the case for or against salt in hypertension." *Hypertension* 13:696–705, 1989). Ch'i Po reported to the Yellow Emperor that "salt hardens the pulse". (Ruskin, A. Classics in arterial hypertension. C. C. Thomas, Springfield, Ill., p. xiii, 1956). In 1904, Ambard and Beaujard found that salt restriction lowered blood pressure (Ambard, L. and Beaujard, E. Causes of arterial hypertension (trans). In: Classics in arterial hypertension, ed. by A. Ruskin, C. C. Thomas, Springfield, Ill., pp. 297–310, 1956). These investigators concluded that an inability to excrete salt was a possible cause of hypertension. In the 1940's, Kempner endorsed low salt diet therapy with a rice-fruit diet that drastically reduced both salt and protein (Kempner, W. "Treatment of hypertensive vascular disease with rice diet." *Amer. J. Med.* 4:545–577, 1948). However, it was Grollman et al. who showed that the reduction in blood pressure was due solely to the salt restriction. (Grollman, A., Harrison, T. and Mason, M. "Sodium restriction in diet for hypertension." *JAMA* 129:533–537, 1954). The importance of salt intake to the genesis of hypertension has been a matter of public health concern since Dahl and Love reported in 1954 that the national prevalence of hypertension was directly related to the average national salt intake. (Dahl, L. K. and Love, R. A. "Evidence for a relationship between sodium (chloride) intake and human essential hypertension." *Arch. Intern. Med.* 94:525–531, 1954; Dustan, H. P. and Kirk, K. A. "Corcoran lecture: the case for or against salt in hypertension." *Hypertension* 13:696–705, 1989). This concern has sparked many large scale studies as to the role of salt intake in the development of hypertension.

Several lines of evidence support a link between salt consumption and hypertension. Epidemiological studies where different communities had either a dietary assessment of salt intake or measurement of 24 hr urinary sodium excretion have shown a close relationship between blood pressure and sodium intake or excretion (Gliebermann, L. "Blood pressure and dietary salt in human populations." *Ecol. Food Nutr.* 2:143-155, 1973; Intersalt Cooperative Research Group "Intersalt: an international study of electrolyte excretion and blood pressure. Results for 24 hour urinary sodium and potassium excretion." *Br. Med. J.* 297:319-328, 1988). However, in the majority of these studies, this relationship has not been found in individuals within a given community (MacGregor, G. A. "Salt and hypertension." *Br. J. Clin. Pharmacol.* 21:1235-1285, 1986). Another supporting line of evidence comes from intervention studies. In Belgium, a government campaign to reduce salt intake resulted in a decrease in salt consumption from 15 to 9 g per day over the period of 1968 to 1981 (Joossens, J. V and Geboers, J. "Salt and Hypertension." *Prev. Med.* 12:53-59, 1983). During this time, a fall in stroke mortality was noted. A similar campaign in Japan was less successful with daily salt intake falling from 14.5 to 12.5 g between 1971 and 1981. However, there was a fall in the prevalence of high blood pressure and a decrease in cerebrovascular disease during this time. Whether the decrease in cardiovascular disease was a direct result of the decrease in salt consumption is unclear.

Perhaps the most convincing evidence linking salt intake and hypertension comes from animal studies. In well-controlled animal studies, an increase in salt intake in both inherited and experimental forms of hypertension caused a further rise in blood pressure. (MacGregor, G. A. "Salt and hypertension." *Br. J. Clin. Pharmacol.* 21:1235-1285, 1986). Kidney cross-implantation studies between hypertensive and normotensive rats have demonstrated that the blood pressure of the recipient follows that of the donor (Dr. Wardener, H. E. "The primary role of the kidney and salt intake in the aetiology of essential hypertension: part I." *Clin. Sci.* 79:193-200, 1990). These results suggest that compensatory mechanisms to overcome an inability of the kidney to excrete sodium may be responsible for the development of hypertension (MacGregor, G. A. "Salt and hypertension." *Br. J. Clin. Pharmacol.* 21:1235-1285, 1986). Finally, there is clear evidence that restriction of salt intake causes a substantial fall in blood pressure in patients who already have hypertension (MacGregor, G. A. "Salt and hypertension." *Br. J. Clin. Pharmacol.* 21:1235-1285, 1986; Kempner, W. "Treatment of hypertensive vascular disease with rice diet." *Amer. J. Med.* 4:545-577, 1948). Furthermore, the effects of salt restriction are additive to those of antihypertensive drugs (Ewrteman, T. M., Nagelkerke, N., Lubsen, J., Kosta, M. and Dunning, A. J. "Beta-blockade, diuretics and salt restriction for the management of mild hypertension: a randomized double blind trial." *Br. Med. J.* 289:406-409, 1984).

The sum of the evidence relating excess salt consumption to hypertension has prompted many investigators, clinicians, committees and task forces to recommend a reduction in daily salt consumption. The 1988 Surgeon General's Report on Nutrition and Health recommends that "a prudent approach, given present knowledge, would be to limit salt consumption by cooking with only small amounts, refraining from adding salt to food at the table, and avoiding salty prepared foods." (U.S. Department of Health and Human Services, The Surgeon General's Report on Nutrition and Health, Public Health Service. Washington, D.C.: DHHS Publication No. 88-50210, 1988). The Food and Nutrition Board recommends a daily salt intake of 6.0 g or less per day. (Subcommittee on the Tenth Edition of the RDA's—Food and Nutrition Board National Research Council, Recommended Dietary Allowances. 10th ed., Washington, D.C.: National Academy Press, 1989) . In addition, the Nutrition Committee of the American Heart Association has recommended a more severe limitation of 3.0 g of salt per day for adults (American Heart Association Nutrition Committee, "Dietary Guidelines for Healthy American Adults." *Circulation* 77:721-724, 1988).

Despite the recommendations, many hypertension patients consider it a hardship to maintain a salt-restricted diet. The general (normotensive) public may even be more resistant to such restrictions. For this reason, efforts have been made to develop seasoning agents to replace salt. However, as noted below, in spite of the clear definition of the problem, the "perfect" salt substitute has previously eluded researchers.

Because the intake of NaCl by humans is often in excess of health and growth requirements, psychological and/or social factors are likely to be involved in this excess intake (Gliebermann, L. "Blood pressure and dietary salt in human populations." *Ecol. Food Nutr.* 2:143-155, 1973; Intersalt Cooperative Research Group. "Intersalt: an international study of electrolyte excretion and blood pressure. Results for 24 hour urinary sodium and potassium excretion." *Br. Med. J.* 297:319-328, 1988; American Heart Association Nutrition Committee, "Dietary Guidelines for Healthy American Adults." *Circulation* 77:721-724, 1988). Further, because of the hardship often associated with salt-restricted diets, it is important to provide methods to modify this behavior. The use of salt enhancers/substitutes is such a method.

2.2. EVIDENCE OF THE FAILURE OF OTHERS TO SOLVE THE PROBLEMS

The most commonly used salt substitutes are based on potassium chloride (KCl). However, potassium chloride has an unpleasant, bitter taste limiting its use as a substitute. This compound is often combined with citric or other acids, monopotassium glutamate, choline, ammonium chloride or spices to alleviate the bitter aftertaste (Frank, R. L. and Mickelsen, O. "Sodium—potassium chloride mixtures as table salt." *Amer. J. Clin. Nutr.* 4:467-470, 1969). Sodium and potassium chloride are also combined and sold as "lite" salt mixtures.

Other investigators have looked to "salty" peptide derivatives as alternatives to salt, ornithyltaurine and ornithyl-B-alanine in particular (Tamura, M., Seki, T., Kawasaki, Y., Tada, M., Kikuchi, E. and Okai, H. "An enhancing effect on the saltiness of sodium chloride of added amino acids and their esters." *Agric. Biol. Chem.* 53:1625-1633, 1989; Seki, T., Kawasaki, Y., Tamura, M., Tada, M., and Okai, H. "Further study on the salty peptide ornithyl-B-alanine. Some effects of Ph and additive ions on the saltiness." *J. Agric. Food Chem.* 38:25-29, 1990). However, these compounds are not salty in the absence of HCl. Moreover, the difficulty of synthesis and cost may limit their utility as salt substitutes (Worthy, W. "New sweet, salty peptides synthesized." *Chemical & Engineering News.* Jan 8:25-29, 1990).

The failure of others arises from the specificity of the physiological mechanism for salt taste perception. According to current theory, the taste of salt begins when sodium ions pass through specialized pores, or sodium channels, in taste bud cell membranes. The influx of sodium ions causes the taste bud cells to depolarize, triggering the release of neurotransmitters which excite the nerves carrying the salt message to the brain. (Heck G. L. et al. "State Taste Transduction Occurs Through an Amiloride-Sensitive Sodium Transport Pathway." *Science* 223: 403-4 (1984); Hille, B. "Ionic Channels of Excitable Membranes," 2nd Ed., Sinauer Associates, Sunderland, Mass., 1992, p. 66). So far, only lithium has been shown to be comparable to sodium in passing through the sodium channel (Id., p. 79;), thus limiting the possibilities for "true" salt alternatives. Knowledge of the mechanism of salt taste perception, coupled with the finding that lithium chloride is poisonous (Schou, M. "Biology and pharmacology of the lithium ion." *Pharmacol. Rev.* 9:17-31, 1957), has led some to search for salt enhancers, that is, substances which boost the "saltiness" of sodium-containing compounds, thereby permitting the use of lower levels of sodium chloride. However, until now, researchers likewise have been stymied in their quest for salt enhancers, with one chemosensory physiologist in Virginia recently reporting that he had spent 18 months screening food compounds without uncovering any good candidates (Erickson, D. "Trick of the Tongue: A Unique Mechanism of Taste Means No Substitute for Salt." *Scientific American,* pages 80-81, May 1990).

The instant invention is a different solution to the problem where practical salt enhancers are provided. This invention discloses the first method, utilizing the derivatives of amiloride, indanyloxyacetic acid, and anthranilic acid.

2.3. PAST WORK ON ANIMAL MODELS OF SALT INTAKE

A number of experimental paradigms have been developed to enhance the natural appetite of rats for salt. These models represent an extension of the natural craving of most animals for salt. These paradigms include: 1) bilateral adrenalectomy, 2) hypothyroidism, and 3) the administration of diuretics, metyrapone, estrogen, methylxanthines, propranolol, large doses of deoxycorticosterone acetate (DOCA) and polyethylene glycol (s.c.). The renin-angiotensin-aldosterone system appears to be involved in the induction of a salt appetite in each of these paradigms (Fregly, M. J. and Rowland, N. E. "Role of renin-angiotensin-aldosterone system in NaCl appetite in rats." *Am. J. Physiol.* 248:R1-R11, 1985).

Rice and Richter were the first to report that DOCA increased the spontaneous intake of salt (sodium chloride; NaCl) in rats (Rice, K. K. and Richter, C. P. "Increased sodium chloride and water intake of normal rats treated with desoxycorticosterone acetate." *Endocrinology* 33:106-115, 1943). Tosteson et al. showed that both normal and hypertensive rats significantly increased their intake of a 0.17M NaCl solution following daily injections of 2.5 mg of DOCA (Tosteson, D. C., De Friez, A. I. C., Abrams, M., Gottschalk, C. W, and Landis, E. M. "Effects of adrenalectomy, desoxycorticosterone acetate and increased fluid intake of sodium chloride and bicarbonate by hypertensive and normal rats." *Am. J. Physiol.* 164:369-379, 1951). The administration of increasing amounts of relatively large doses of deoxycorticosterone trimethylacetate (3.7-100 mg/kg, i.m.) has been shown to produce graded increases in the intake of both 0.154M and 0.333M NaCl (Wolf, G. "Effects of desoxycorticosterone on sodium appetite of intact and adrenalectomized rats." *Am. J. Physiol.* 208:1281-1285, 1965). Moreover, the implantation (s.c.) of DOCA pellets (105 mg DOCA/rat) not only increased the intake of solutions containing NaCl, but importantly also lowered the taste preference threshold of rats for salty solutions (Herxheimer, A. and Woodbury, D. M. "The effect of desoxycorticosterone on salt and sucrose taste preference thresholds and drinking behavior in rats." *J. Physiol.* 151:253-260, 1960). Based on the reported effects of DOCA on the intake of NaCl, an animal model has been created for the identification of salt substitutes and enhancers.

3. SUMMARY OF THE INVENTION

The present invention is generally directed to the use of amiloride, indanyloxyacetic acid and anthranilic acid derivatives as salt or sodium chloride (NaCl) substitutes and enhancers. The invention covers compositions which are effective as salt substitutes which comprise novel mixtures of sodium chloride and the above-noted compounds, particularly in sodium chloride to compound ratio between about 10,000:1 and 1:1,000. Yet another embodiment of the invention is directed to a method of imparting saltiness to, or enhancing the saltiness of, edible materials by the administration or use of such novel compositions. The invention further covers a method of enhancing the saltiness of edible materials by the addition of the above-noted compounds.

3.1 BRIEF DESCRIPTION OF DRAWINGS

FIG. 1. Intake of 0.9% NaCl solution in control and DOCA injected rats as a function of time.

Figure 2:
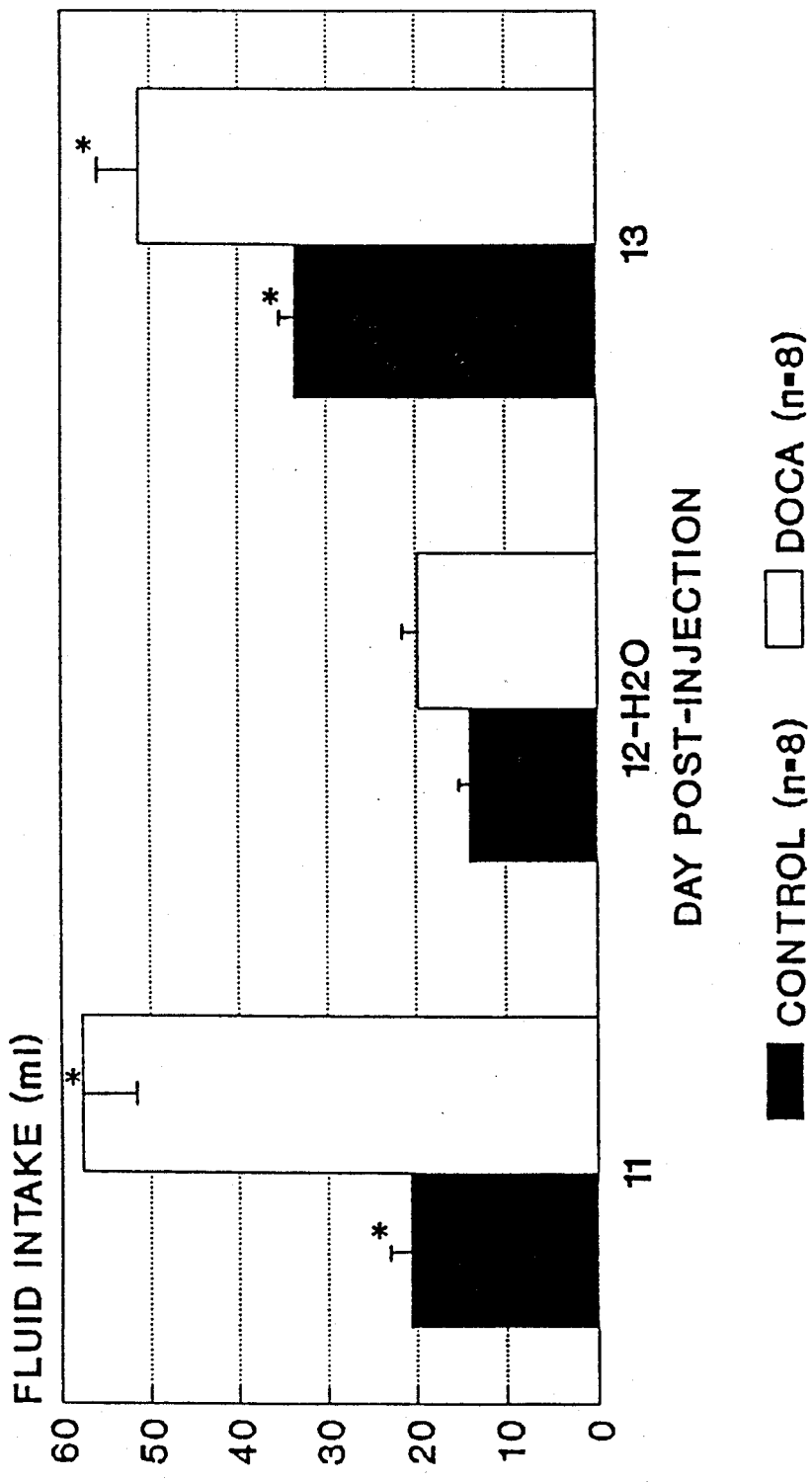

FIG. 2. Evidence that DOCA enhances intake of NaCl solutions and not fluids in general.

Figure 3:
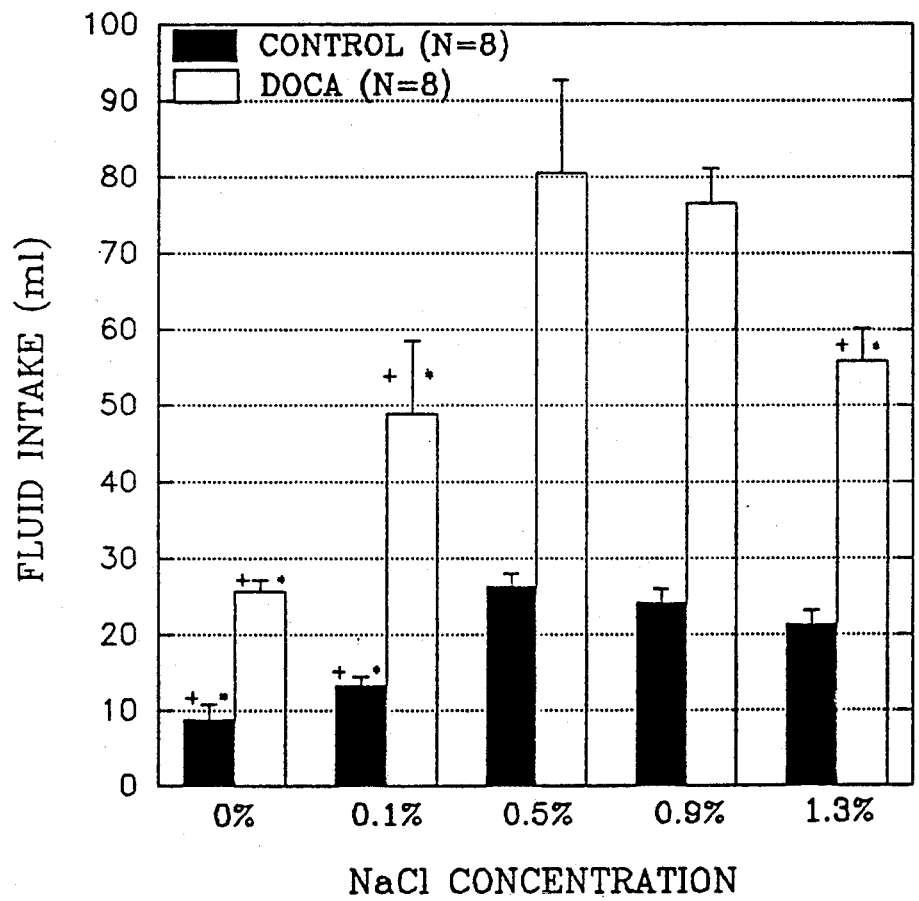

FIG. 3. Salt acceptance for various NaCl concentrations.

Figure 4:
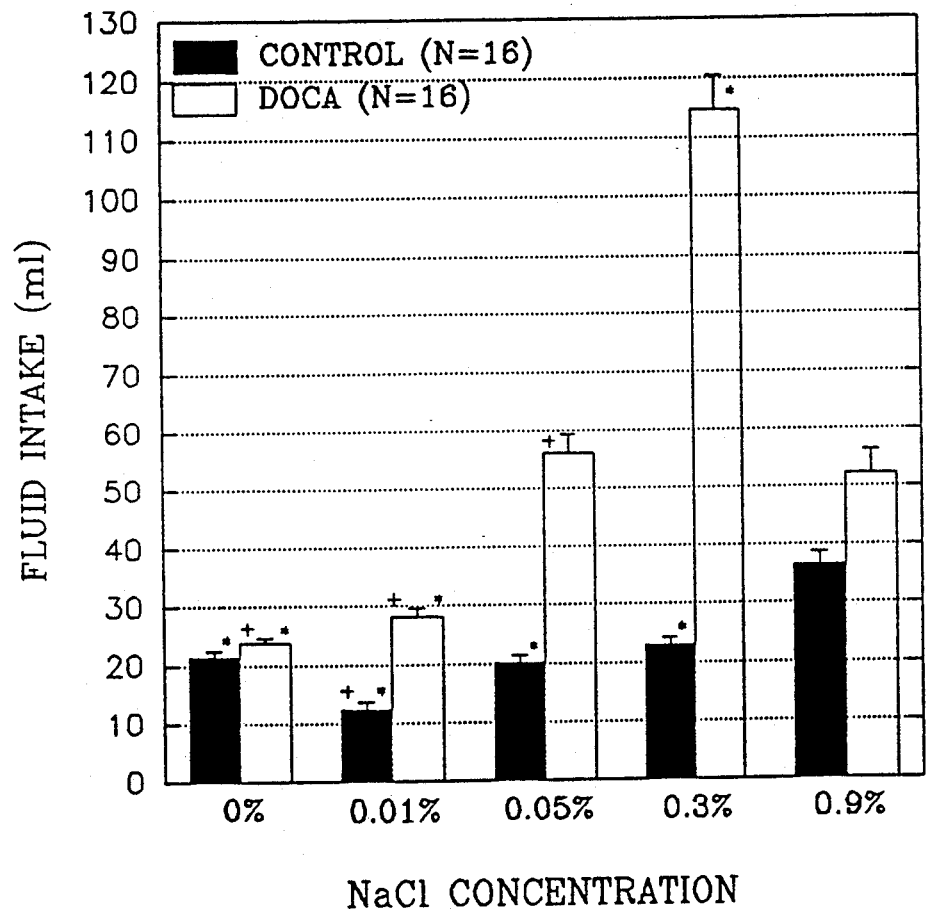

FIG. 4. Salt acceptance for DOCA-treated animals.

Figure 5:
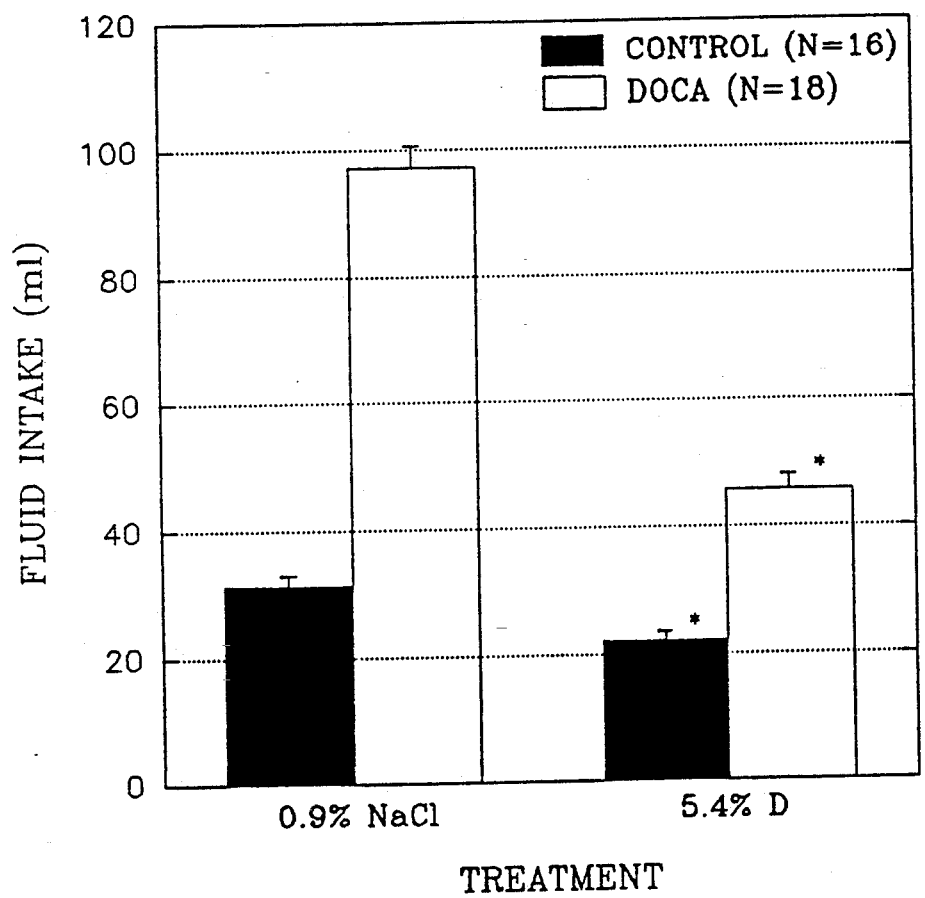

FIG. 5. Animals consume more 0.9% NaCl than 5.4% dextrose solution.

Figure 6:
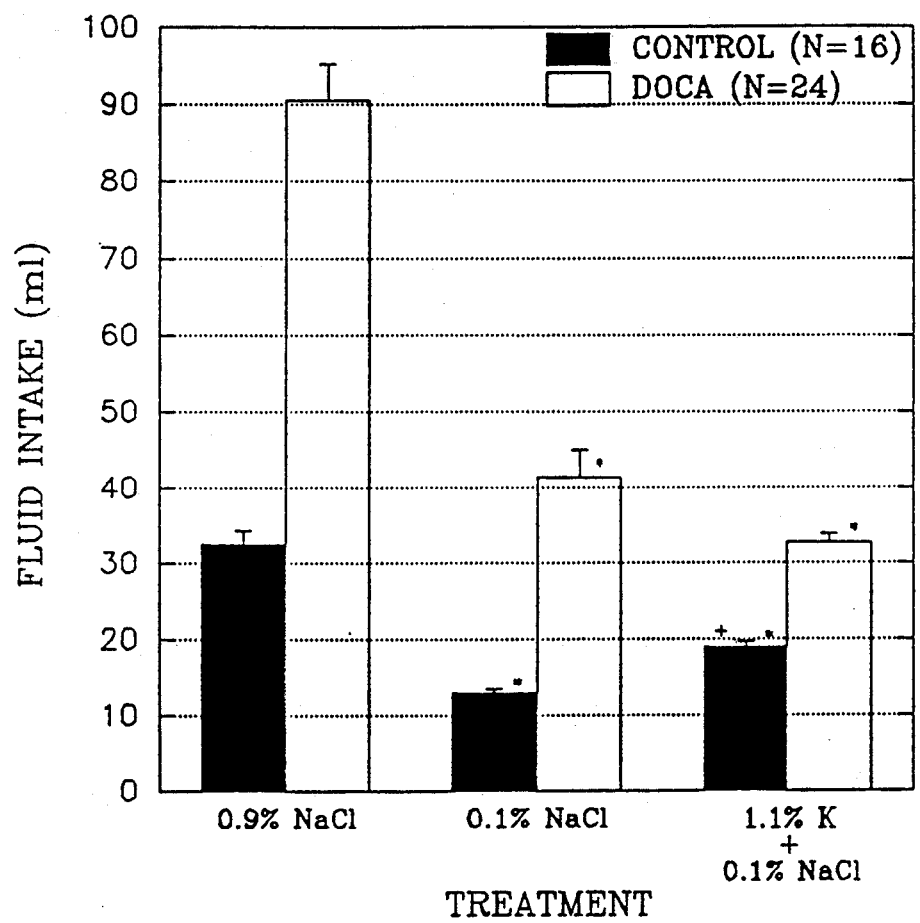

FIG. 6. Comparison of KCl/NaCl mixture to NaCl alone.

Figure 7:
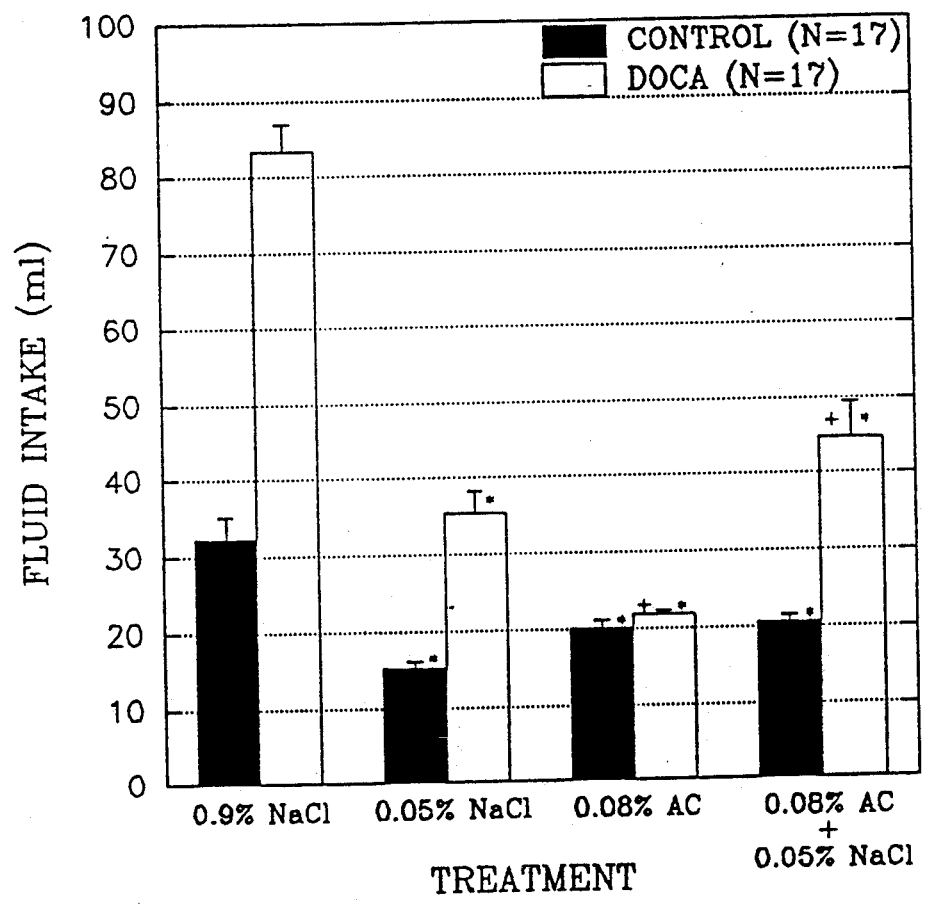

FIG. 7. Comparison of ammonium chloride to NaCl.

Figure 8:
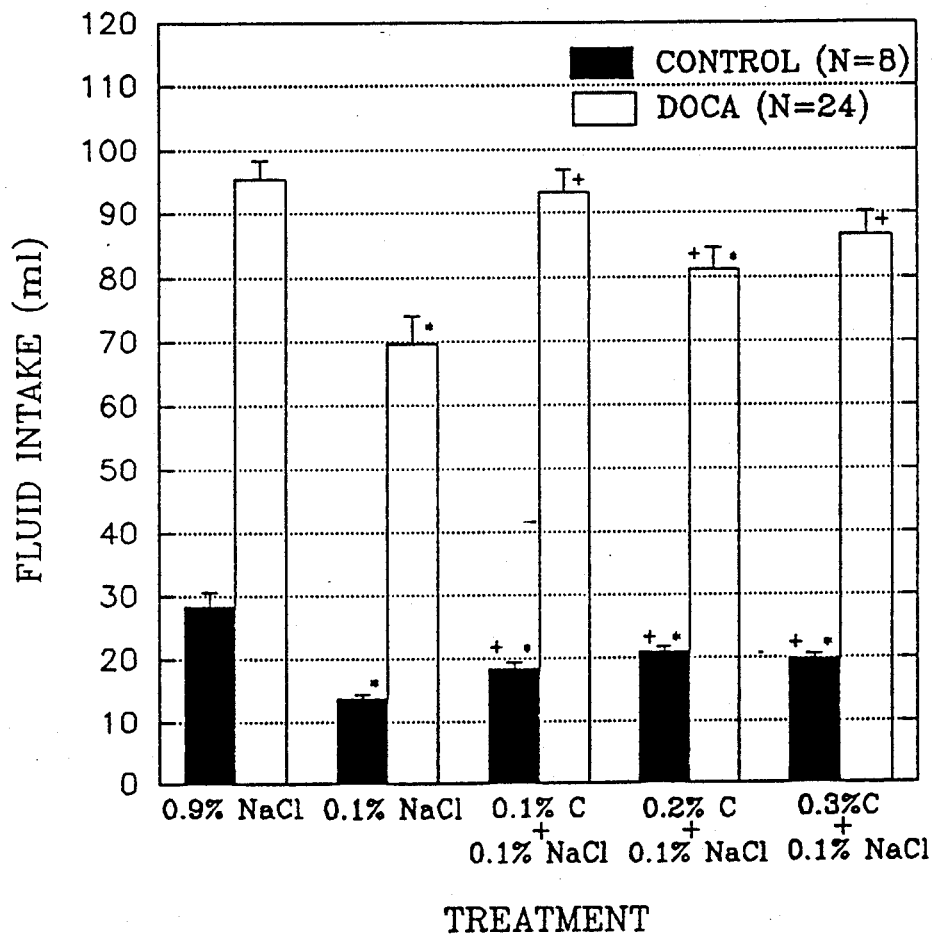

FIG. 8. Comparison of 0.1% NaCl to 0.1% NaCl with 0.1%, 0.2%, and 0.3% choline chloride.

Figure 9:
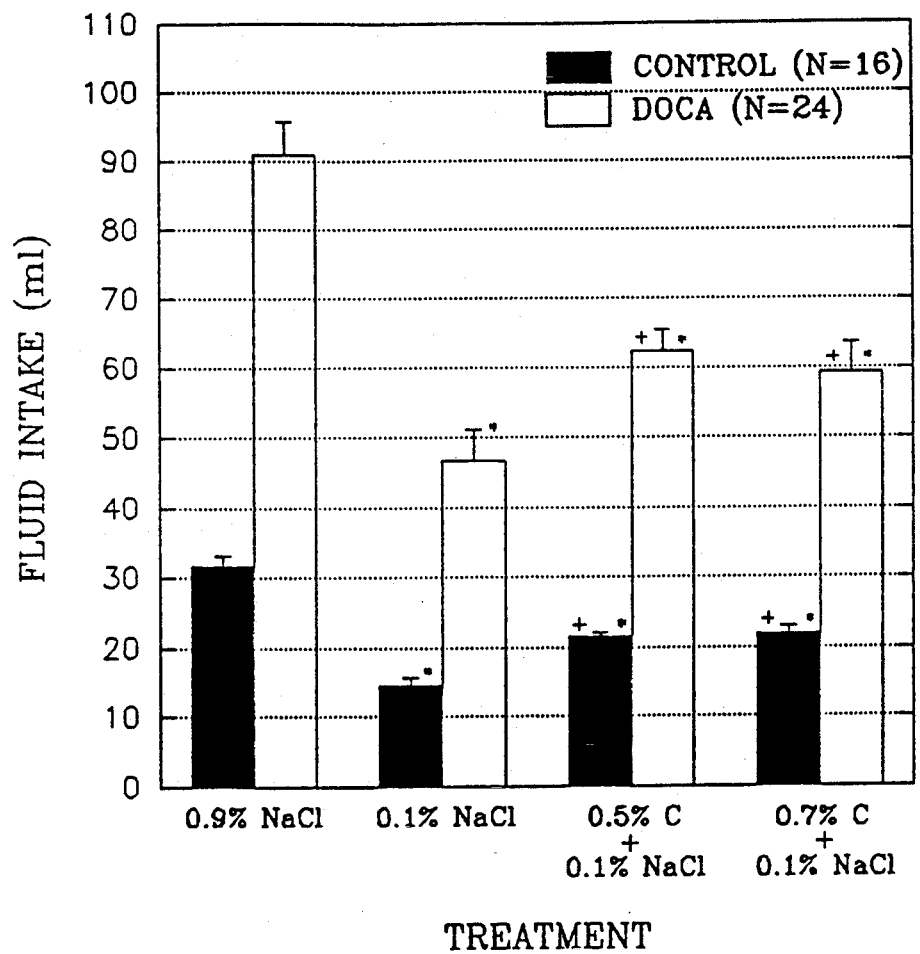

FIG. 9. Comparison of 0.1% NaCl to 0.1% NaCl with 0.5% and 0.7% choline chloride.

Figure 10:
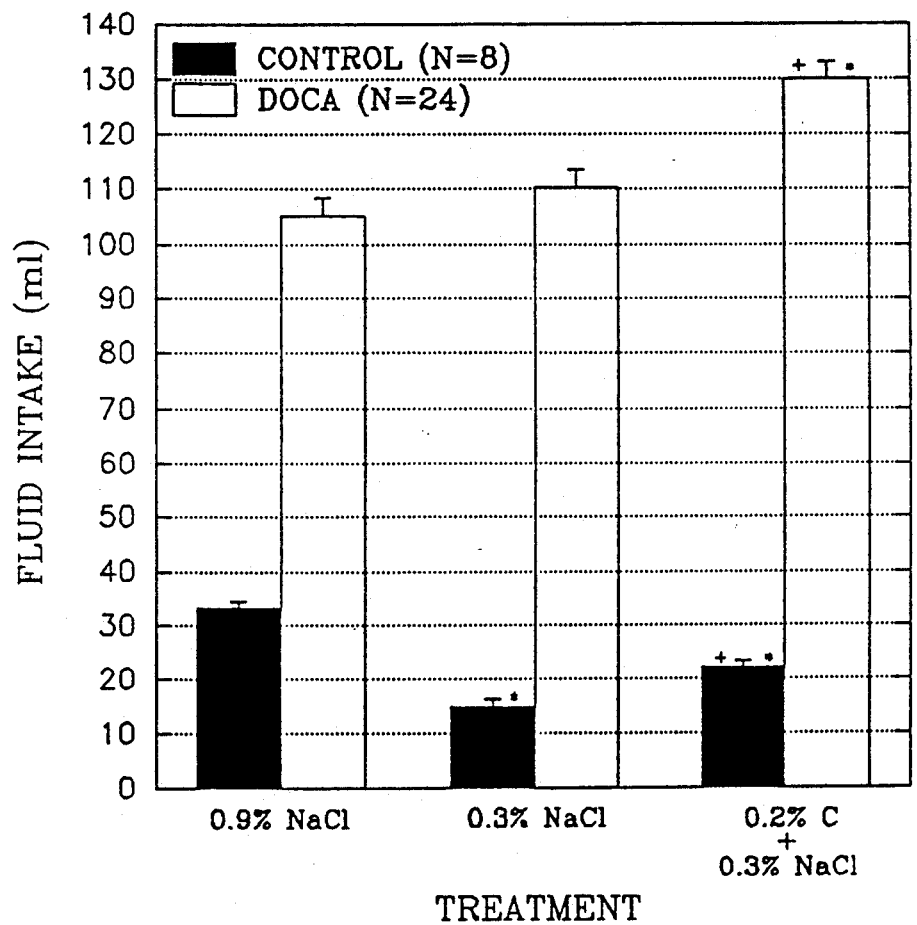

FIG. 10. Comparison to 0.3% NaCl to 0.3% NaCl with 0.3% NaCl and 0.2% choline chloride.

Figure 11:
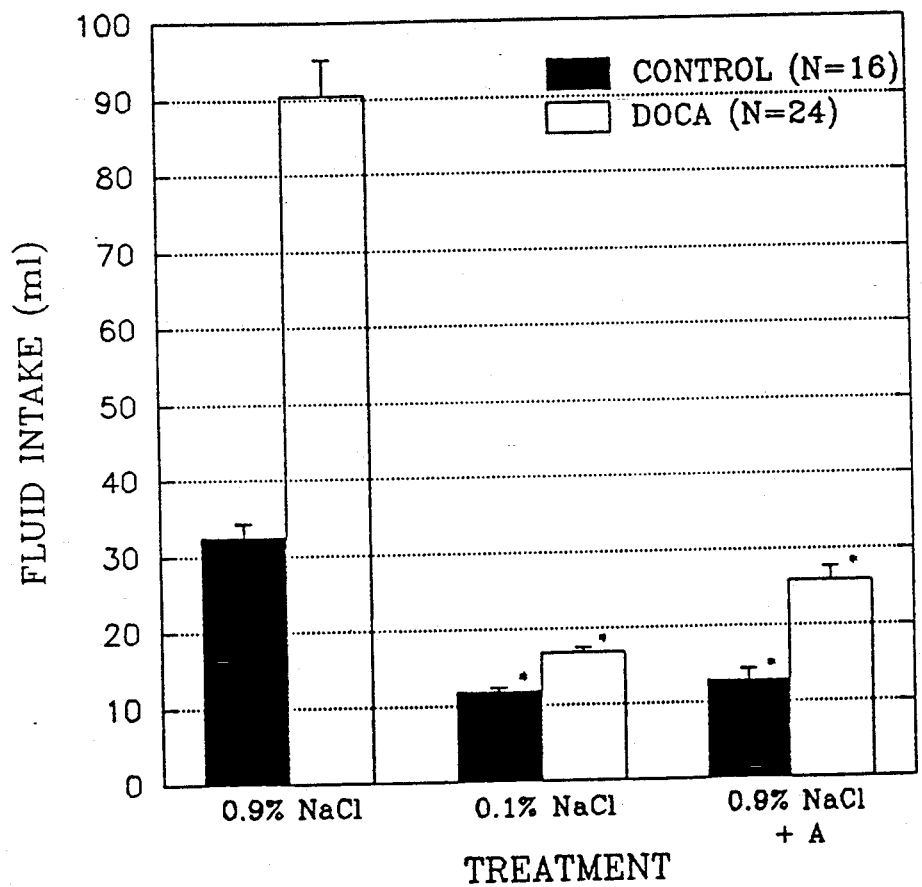

FIG. 11. Effect of Amiloride on NaCl intake.

Figure 12:
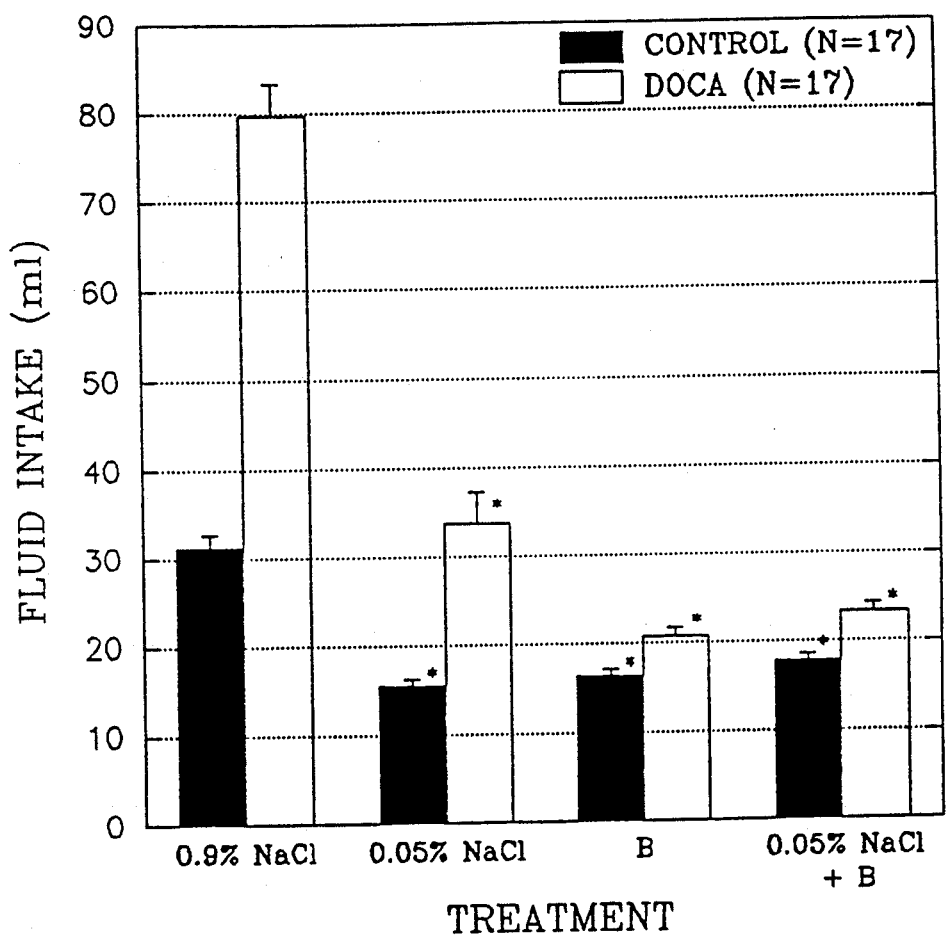

FIG. 12. Effect of benzamil on NaCl intake.

Figure 13:
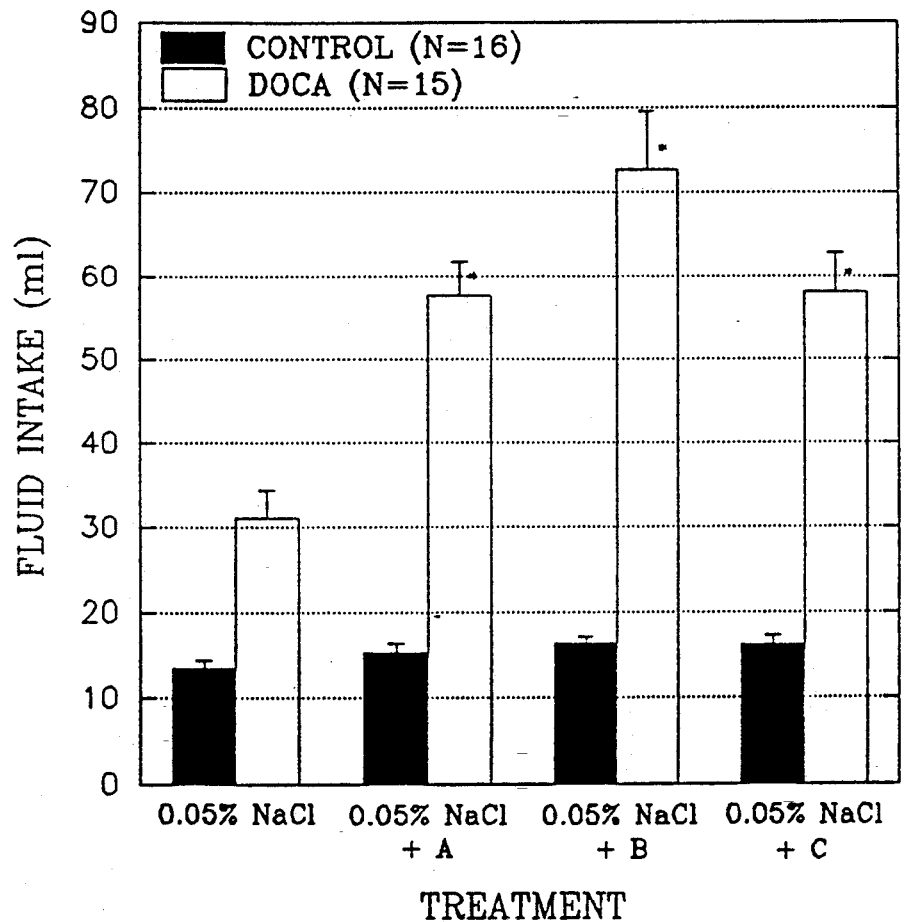

FIG. 13. Effect of 5-(N,N-dimethyl)-amiloride on NaCl intake.

Figure 14:
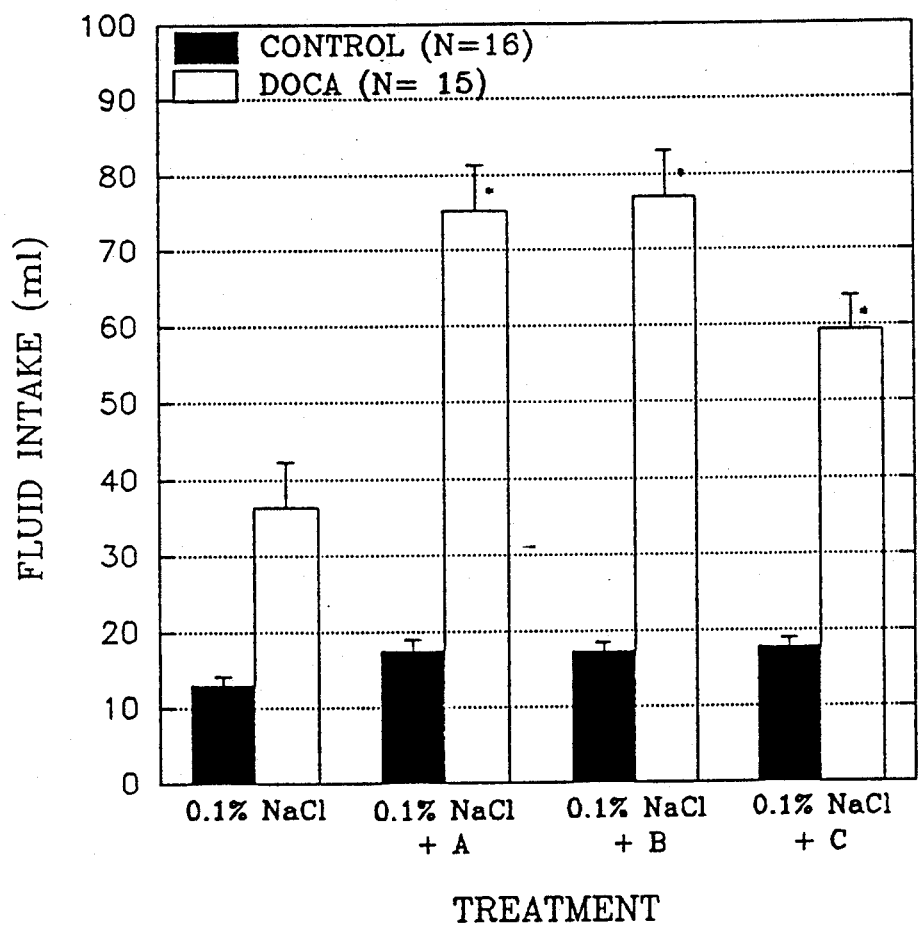

FIG. 14. Effect of 5-(N,N-hexamethylene)-amiloride on NaCl intake.

Figure 15:
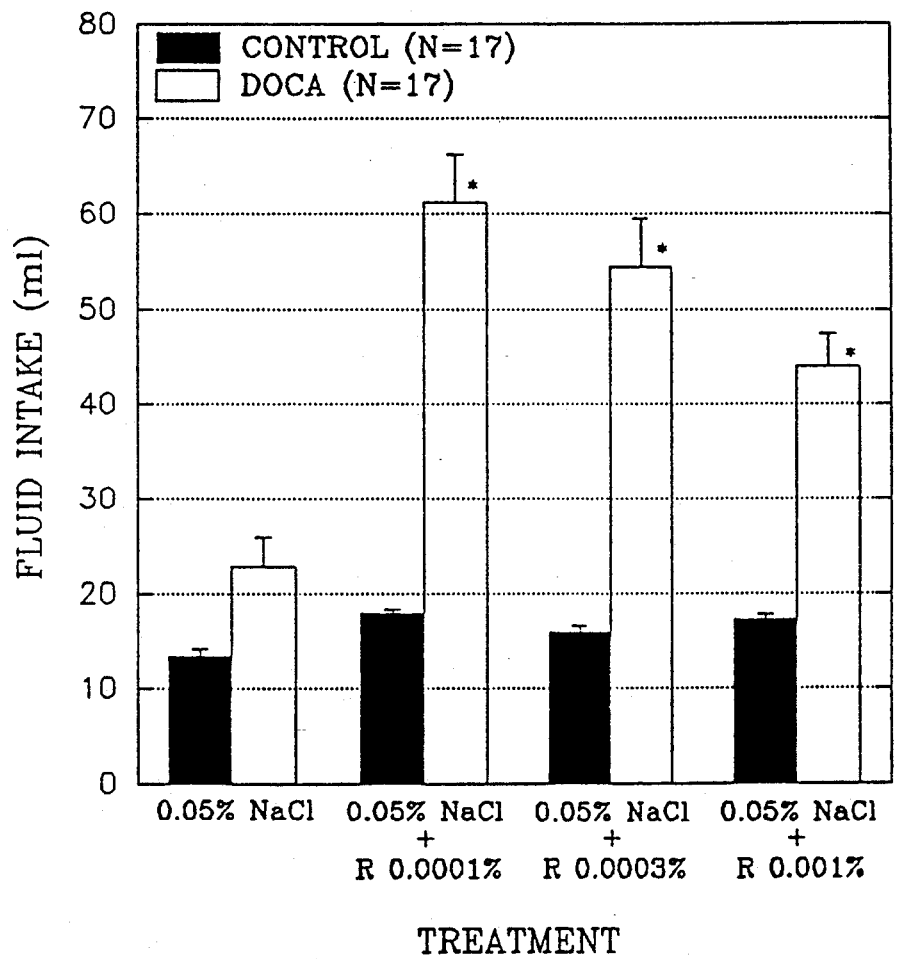

FIG. 15. Effect of R(+)-IAA-94 on NaCl intake.

4. DESCRIPTION OF THE PREFERRED EMBODIMENTS

The present invention is generally directed to the use of compounds which are derivatives of amiloride, indanyloxyacetic acid and anthranilic acid as salt or sodium chloride (NaCl) substitutes and enhancers. These compounds, as used herein, include the compounds themselves as a free base and all salts of these compounds (e.g., hydrochloride or maleate salts of the compounds)

The compositions of the present invention include an effective amount of sodium chloride in combination with one or more of the compounds. An effective amount of sodium chloride is that amount of sodium chloride which is above the threshold for detection by humans and, therefore, capable of enhancement by the addition of the compounds. As the perception of saltiness is somewhat subjective, this threshold necessarily varies from person to person and with the nature and form of the material consumed, i.e. liquid, solid, raw, baked or cooked.

In the compositions of the present invention, the ratio of sodium chloride to the compounds or mixture of compounds may vary generally between 10,000:1 and 1:1,000, and between 10,000:1 and 1:1, with a preferred ratio being between 5,000:1 and 5:1. These ratios for human use can only be estimated from their effectiveness in the animal model, which is described in detail below. The choice of a particular ratio will necessarily depend on several factors, including which particular compound or compounds are used.

Edible materials to which the compositions of the present invention can be added include anything in which salt is normally found or used, such as, for example, fruits, vegetables, juices, soups, meat products, egg products, fruit concentrates, salad dressings, milk products, seasonings, grain products such as breads, cereals and other baked goods, cheese products, beverages, confections and processed foods. The compounds may also be used to enhance the saltiness of commercially available low sodium products or to reduce the sodium content of products containing large amounts of sodium.

The compositions of the present invention may also be used, according to the methods of the present invention, to impart saltiness to, or enhance the saltiness of, a wide variety of edible materials. When used in such a manner, the compositions of the present invention may be added, for example, in the form of solutions, powders, granules, emulsions during the preparation of the edible materials. The compositions of the present invention may also be used, in granular or crystalline form, to topically salt foods that have already been prepared, such as pretzels and french fries, or to salt foods to be cooked, such as meats and vegetables. Inert materials that absorb water, such as calcium carbonate, silica or dibasic or tribasic calcium phosphate, may be added in sufficient quantity to maintain a free-flowing granular mixture.

5. DISCUSSION OF SUPPORTING DATA

Because animal studies have been used to establish the invention of the above-noted compounds as salt substitutes and enhancers, these studies are herewith described in detail.

5.1 THE ANIMAL MODEL FOR IDENTIFICATION OF SALT SUBSTITUTES/ENHANCERS

Studies using male Sprague-Dawley rats were conducted to demonstrate the effectiveness of derivatives of amiloride and indanyloxyacetic acid as salt substitutes and enhancers. After habituation to the animal colony room, rats were housed individually in standard polycarbonate cages and placed on a diet containing only about 0.02% sodium (Teklad Diet #TD 85292, Madison, Wis.). Taste (fluid consumption) testing was conducted in the animal's home cage. Fluid intake in rats was evaluated in a one-bottle acceptance assay. In this assay, rats were deprived of fluid for 16 hrs starting at 17:00 hr and then allowed access to a water bottle containing the test solution for 2 hr. At the end of the access period, water bottles were returned to each cage and intake of the test solution was calculated. All animals received each test solution within a given experiment. Rats were habituated to the testing schedule and the taste of 0.9% (0.15M) NaCl before testing novel solutions. Salt taste acceptance was studied in rats receiving either a subcutaneous injection of DOCA (100 mg/kg) or its vehicle peanut oil. Except for the initial time course study, animals received injections of DOCA or peanut oil on a weekly basis to maintain high levels of saline intake.

5.1.1. One-Bottle versus Two-Bottle Assay

The one-bottle acceptance assay, rather than the more traditional two-bottle preference procedure, was selected specifically for these studies. The one-bottle assay was selected primarily because ion transport modulators were among the group of compounds to be evaluated. Consumption of a compound that modulates the functioning of ion transport (i.e., a sodium channel modulator) makes it very difficult, if not impossible, for an animal to display a true preference in a two-bottle procedure. Once the transport modulator opens (or closes) the appropriate channels on the animal's tongue, the taste of the two solutions become either indistinguishable or the taste of one is significantly altered by taste of the other. For example, if the intake of a solution containing a small quantity of salt and a sodium channel modulator was compared to that of a standard salt solution in a two-bottle procedure, the sodium channel modulator would significantly alter the consumption of (and preference for) both test solutions. In a one-bottle assay, only the consumption of the solution containing the sodium channel modulator would be affected. In addition, it has been shown by a number of investigators (i.e., Rabe, E. F. and Corbit, J. D. "Post-ingestional control of sodium chloride solution drinking in the rat." *J. Comp. Physiol. Psychol.* 84: 268–274, 1973; Weiner, I. H. and Stellar, E. "Salt preference of the rat determined by a single-stimulus method." *J. Comp. Physiol. Psychol* 44: 391–401, 1951) that the results of studies evaluating the intake of different standard concentrations of NaCl solutions in the one-bottle assay are comparable to those described for the two-bottle procedure.

5.1.2. DOCA TIME COURSE STUDIES

To determine the time course of the effects of a single injection of DOCA (100 mg/kg, s.c.) on the intake of a 0.9% NaCl solution, test sessions were conducted on 14 consecutive days. The intake of 0.9% NaCl in control and DOCA-injected rats in each session is shown in FIG. 1. The intake of 0.9% NaCl in the control group was significantly greater on Day 1 than that observed on all subsequent days. However, the intake of this group returned to lower levels following a single exposure to the 0.9% NaCl solution. Thereafter, this level of intake remained relatively constant for the duration of the experiment. By comparison, the intake of the saline solution was significantly enhanced ($p<0.05$)[1] in the group of rats receiving the single injection of DOCA. Intake in the DOCA-injected groups increased progressively from day 1 through day 8 post-injection. By day 8, the saline intake of the DOCA-injected groups was 2.5–3.0 times greater than that of the control group. The intake of 0.9% NaCl gradually declined towards control levels in the DOCA-injected group after day 8.

The parameter "p" is defined in F. Williams, "Reasoning with Statistics: How to read quantitative research," 3rd Edition Holt-Rinehart, New York, 1986, pp. 58–59.

On day 12 of the time course experiment (FIG. 2), deionized water (0% NaCl) was substituted for 0.9% NaCl. The substitution was made to ensure that DOCA was specifically enhancing the intake of NaCl solutions and not fluid intake in general. The intake of deionized water on day 12 was significantly less than the intake of 0.9% NaCl consumed on days 11 and 13 in both test groups ($p<0.05$). These results also suggest that fluid intake is not necessarily influenced by the test conditions of the previous day.

5.1.3. RELATIONSHIP BETWEEN [NaCl] AND FLUID INTAKE

To investigate the relationship between salt concentration and intake, a salt acceptance curve was determined in control and DOCA-injected rats (FIG. 3). Groups of animals were randomly presented with 1 of 5 concentrations of NaCl (0, 0.1, 0.5, 0.9 or 1.3%) on successive test days. Intake rose significantly ($p<0.05$) as the NaCl concentration was increased from 0% to 0.5%, but declined significantly ($p<0.05$) when the NaCl concentration was increased further to 1.3%. The level of intake of 0.5% and 0.9% NaCl was 2.5 to 3.0 times greater in the DOCA-injected than the control animals. Both control and DOCA-injected rats displayed a greater acceptance of 0.5% and 0.9% NaCl over the other concentrations. The results of these experiments in control animals using this one-bottle paradigm are consistent with those from studies using the two-bottle procedure (Fregly, M. J. and Rowland, N. E. "Role of renin-angiotensin-aldosterone system in NaCl appetite in rats." *Am. J. Physiol.* 248:R1-R11, 1985; Rice, K. K. and Richter, C. P. "Increased sodium chloride and water intake of normal rats treated with desoxycorticosterone acetate." *Endocrinology* 33:106-115, 1943; Wolf, G. "Effects of desoxycorticosterone on sodium appetite of intact and adrenalectomized rats." *Am. J. Physiol.* 208:1281-1285, 1965; Herxheimer, A. and Woodbury, D. M. "The effect of desoxycorticosterone on salt and sucrose taste preference thresholds and drinking behavior in rats." *J. Physiol.* 151:253-260, 1960).

5.1.4. INCREASED SENSITIVITY TO SALT SOLUTIONS BY DOCA

As originally described by Herxheimer and Woodbury, the chronic administration of DOCA not only increased the intake of solutions containing NaCl, but also increased the sensitivity of DOCA-injected rats to salty solutions. (Herxheimer, A. and Woodbury, D. M. "The effect of desoxycorticosterone on salt and sucrose taste preference thresholds and drinking behavior in rats." *J. Physiol.* 151:253-260, 1960). In a manner similar to that described above, a salt acceptance curve was redetermined in animals that had received weekly DOCA or peanut oil injections for at least 6 months (FIG. 4). Whereas the most acceptable solution to control animals remained at approximately 0.9%, the most acceptable solution to the DOCA-injected rats had shifted to approximately 0.3%. Thus, with chronic DOCA administration, the rats became more sensitive to the taste of salty solutions than control rats. Because of this gradual shift in sensitivity of DOCA-injected animals over time, the appropriate NaCl solution controls were tested in each weekly experiment.

5.1.5. ANIMAL MODEL SPECIFICITY

Several experiments were conducted to address the Specificity of the animal model to salt taste. In one set of experiments, the intake of a sweet dextrose solution was evaluated in control and DOCA-injected rats. Despite the pleasant taste of the solutions, both groups of rats consumed significantly less of a 2.7% (0.15M) and a 5.4% (0.3M) (FIG. 5) dextrose solution than of a standard 0.9% (0.15M) NaCl solution.

Because potassium chloride is used as a salt replacement in a number of products currently on the market, this substance was examined as a salt substitute and as a salt enhancer in control and DOCA-injected rats. As a substitute, concentrations of 1.1% (0.15M) and 0.1% (0.015M) KCl were selected for comparison with 0.9% (0.15M) NaCl. Both control and DOCA-injected rats consumed significantly less 1.1% and 0.1% KCl than 0.9% NaCl ($p<0.05$) (data not shown). The intake of 1.1% KCl was slightly greater than that of 0.1% KCl in both groups of rats. This difference was statistically significant in control animals ($p<0.05$). As an enhancer, a solution was tested containing 1.1% KCl and a relatively low concentration of NaCl (0.1%; 0.017M). A concentration of 1.1% KCl was selected because the intake of 1.1% KCl was greater than that of 0.1% KCl when tested alone. The intake of the combination of 1.1% KCl and 0.1% NaCl was reduced relative to the intake of 0.1% NaCl alone in DOCA-injected rats (FIG. 6). The reverse was true in control animals; the intake of the combination of 1.1% K and 0.1% NaCl was significantly greater than that of 0.1% NaCl alone. The reason for the difference between control and DOCA-injected animals is unclear. However, the DOCA-injected rats may be more sensitive to the bitter properties of KCl than the control rats. Nevertheless, the intake of the combination of 1.1% KCl and 0.1% NaCl did not approach that of 0.9% NaCl in either control or DOCA-injected rats. The results of the experiments with KCl are consistent with those of taste preference tests in humans.

To investigate the importance of the sodium cation to salt taste in the model, a preliminary experiment was performed using ammonium chloride (AC). The intake of 0.08% (0.015M) AC was significantly less than that of 0.9% (0.15M) NaCl in both control and DOCA-injected rats and also significantly less than the intake of 0.05% (0.009M) NaCl in the DOCA-injected group (FIG. 7). AC produced a small, but significant increase in the intake of 0.05% NaCl in DOCA-injected rats. Although this increase in intake may be due to the ability of the ammonium ion to pass through the sodium channel, it is more likely due to the contribution by the additional chloride ions. The chloride ion has been reported to produce approximately 30% of the electrophysiological response to salt taste (Formaker, B. K. and Hill, D. L. "An analysis of residual NaCl taste response after amiloride." *Am. J. Physiol.* 255: R10002-R1007, 1988). The enhancement of saline intake induced by AC in only the DOCA-injected rats may be related to the greater sensitivity of these animals to salt taste.

5.1.6. SUMMARY OF DATA

Based on the results of the experiments above, the one-bottle acceptance assay yields data comparable to that generated by others using two-bottle or multi-bottle procedures in terms of specificity for the NaCl taste (general lack of acceptance of dextrose, KCl, ammonium chloride and water solutions) and the appropriate sensitivity for that taste (the most acceptable solutions in control rats being 0.5% and 0.9% NaCl) (Fregly, M. J. and Rowland, N. E. "Role of renin-angiotensin-aldosterone system in NaCl appetite in rats." *Am. J. Physiol.* 248:R1-R11, 1985; Rice, K. K. and Richter, C. P. "Increased sodium chloride and water intake of normal rats treated with desoxycorticosterone acetate." *Endocrinology* 33:106-115, 1943; Tosteson, D. C., De Friez, A. I. C., Abrams, M., Gottschalk, C. W, and Landis, E. M. "Effects of adrenalectomy, desoxycorticosterone acetate and increased fluid intake of sodium chloride and bicarbonate by hypertensive and normal rats." *Am. J. Physiol.* 164:369-379, 1951; Wolf, G. "Effects of desoxycorticosterone on sodium appetite of intact and adrenalectomized rats." *Am. J. Physiol.* 208:1281-1285, 1965; Herxheimer, A. and Woodbury, D. M. "The effect of desoxycorticosterone on salt and sucrose taste preference thresholds and drinking behavior in rats." *J. Physiol.* 151:253-260, 1960). Furthermore, the results from the one-bottle procedure in rats are consistent with the results of studies in humans (i.e., the discriminability of different NaCl concentrations; the bitterness of KCl. Frank, R. L. and Mickelsen, O. "Sodium—potassium chloride mixtures as table salt." *Amer. J. Clin. Nutr.* 4:467-470, 1969). The use of DOCA-injected animals, in addition to control animals, offers the advantage of a model that is extremely sensitive to salt taste (that becomes more sensitive over time) and the advantage of a broad window of intake (up to 80 ml vs. 15 ml in control rats) with which to detect salt-enhancing properties of novel compounds and quantitative differences between these compounds. Taken together, the results of the experiments conducted to date support the use of this animal model for evaluating compounds for salt-like taste qualities.

5.2 VALIDATION OF THE ANIMAL MODEL WITH RESPECT TO HUMANS

To validate the animal model for identification of salt substitutes and enhancers, choline chloride (C) was selected for evaluation for salt-like taste qualities both in DOCA-injected rats and by a panel of humans. Choline chloride is listed by the Federal government as a GRAS (Generally Regarded As Safe) compound (Code of Federal Regulations. Volume 21, parts 170-199, Apr. 1, 1988 revision).

5.2.1. RESULTS ON CHOLINE CHLORIDE WITH RATS

Concentrations of 2.1% (0.15M) and 0.2% (0.015M) C were selected for comparison with 0.9% (0.15M) NaCl. As with KCl, both control and DOCA-injected rats consumed significantly less 2.1% and 0.2% C than 0.9% NaCl ($p<0.05$) (data not shown).

Several experiments were conducted to explore the possibility that C might serve as a salt taste enhancer. Because baseline 0.9% NaCl intake tended to increase in DOCA-injected animals with each weekly DOCA injection, intake was evaluated relative to the intake of 0.9% NaCl (determined weekly), as well as to other appropriate NaCl concentrations. In the first experiment, 0.1% NaCl was tested alone and in combination with 0.1% (0.0075M), 0.2% (0.015M) or 0.3% (0.023M) C (FIG. 8). In DOCA-injected rats, the intake of the combination of 0.1% NaCl and either 0.1% or 0.3% C was significantly greater ($p<0.05$) than that of 0.1% NaCl alone and not significantly different from the intake of 0.9% NaCl. The intake of the combination of 0.1% NaCl and 0.2% C was significantly greater ($p<0.05$) than the intake of 0.1% NaCl alone, but fell just short of that of 0.9% NaCl ($p<0.05$). In control animals, the intake of the combination of 0.1% NaCl and 0.1%, 0.2% or 0.3% C was significantly greater than the intake of 0.1% NaCl alone ($p<0.05$). However, the intake of all 3 combinations of C with 0.1% NaCl was significantly less than the intake of 0.9% NaCl ($p<0.05$).

The second experiment was an extension of the first; 0.1% NaCl was tested alone and in combination with 0.5% (0.038M) or 0.7% (0.053M) C (FIG. 9). The intake of 0.1% NaCl was significantly enhanced by the addition of either 0.5% or 0.7% C in both control and DOCA-injected groups ($p<0.05$). However, the intake of each of the test solutions was significantly less than the intake of 0.9% NaCl in the respective control and DOCA-injected groups ($p<0.05$). In a third experiment, a higher concentration of NaCl (0.3%; 0.051M) was tested in combination with C (FIG. 10). In DOCA-injected rats, the intake of the combination of 0.3% NaCl and 0.2% C was significantly greater than the intake of either 0.3% or 0.9% NaCl ($p<0.05$). The intake of 0.3% NaCl was not significantly different from that of 0.9% NaCl in these animals; however, the intake of 0.1% NaCl was significantly less than the intake of both 0.3% and 0.9% NaCl ($p<0.05$). In control animals, the intake of 0.3% NaCl was also significantly enhanced by the addition of 0.2% C ($p<0.05$). However, the intake of 0.3% NaCl was significantly less than that of 0.9% NaCl, as was the intake of the combination of 0.3% NaCl with 0.2% C ($p<0.05$).

5.2.2. RESULTS ON CHOLINE CHLORIDE WITH HUMANS

In addition to the data generated from the animal experiments, taste studies were also conducted in humans. Shear/Kershman Laboratories, Inc. (Creve Coeur, Mo.) was contracted to perform the initial taste profile studies with C. This company specializes in conducting taste tests and formulating food products. Taste tests were conducted by Shear/Kershman at a qualified taste testing facility (Pet Foods, Greenville, Ill.) with appropriate professional assistance. Testing was performed by panels of trained testers. C is listed by the Federal government as a GRAS (Generally Regarded As Safe) compound (Code of Federal Regulations. Volume 21, parts 170-199, Apr. 1, 1988 revision).

Two types of preliminary studies were conducted by Shear/Kershman, taste profiling and taste preference studies. Taste profiling is a non-statistical, but well-established procedure (developed by Arthur D. Little) to determine the potential parameters of use and potential consumer problems with a specific product or additive. To start the profiling process, 4-5 trained panelists, as groups, determined the relative saltiness of NaCl-C combinations compared to standard NaCl solutions. Once relative saltiness was determined for each combination, then other taste characteristics of the NaCl-C mixtures were determined; the sum total representing the profile of C as a potential salt taste enhancer.

The taste panels found that when the levels of NaCl and C in the test solution were low (less than 0.3%), saltiness could be increased by at least a factor of 2. If higher levels of C were used, negative taste factors (bitterness, astringency) became apparent. However, no aftertaste was detected. In further profiling, it was determined that at higher levels of salt (0.4%–0.8%), 25% of the salt could be replaced by C with no detectable change in saltiness and no negative off tastes. Therefore, the results of the preliminary profiling studies of NaCl and C in water solutions suggest that C has the potential to enhance saltiness in bland low salt products and reduce the level of salt in higher salt products. Furthermore, the results of the profiling studies in man support the findings from the animal model. In the second phase of preliminary testing, Shear/Kershman Laboratories performed taste preference testing of NaCl-C combinations in Campbell's low Na+ tomato soup. Taste preference tests were conducted using a paired comparison format with only two samples provided to each panelist per test with a total of 20 panelists per test. Half of the panelists were given the control sample first and the other half received the control second to eliminate order bias. Panelists cleared their palates between testing the two samples. Each sample was rated by the panelists on a Hedonic scale of 0 to 10; 0 being least acceptable and 10 being the most acceptable.

The control sample was Campbell's low Na+ tomato soup to which enough salt was added to raise the salt concentration in the soup from 0.04% to 0.1%. Salt was added to the soup because preliminary studies showed that saltiness was difficult to detect at levels below 0.1%. By comparison, Campbell's regular tomato soup contains approximately 0.8% NaCl. Campbell's regular tomato soup was not an appropriate control for this study because of its different formulation (higher fat content, different color and consistency that would likely influence the selection of the soup, regardless of salt content) from the low Na+ soup. Moreover, the objective of the study was to improve the flavor of a low Na+ product. Samples of the low Na+ soup were tested containing NaCl:C ratios of 3:2, 1:1, 1:2 or 1:3. Fourteen out of 20 panelists preferred the soup with the 1:3 NaCl:C ratio over the control soup. This test soup also received a correspondingly greater mean Hedonic rating than the control soup (5.75 vs. 5.40). Although the results of this preference test are only preliminary, they show that the taste of a low Na+ product on the market can be greatly enhanced by the addition of C.

Because of the successes of the studies conducted in water and tomato soup, C was evaluated by Shear/Kershman Laboratories, Inc. in another test medium. Peas were selected as the test medium to evaluate the effects of topically-applied C. Cooked frozen sweet peas were lightly oiled and then sprinkled with either 0.5% salt (control) or a test salt-C mixture. Both the salt and C dissolved rapidly in the oil to provide a uniform coating of the peas. The salt-C mixtures were tested against control using the pairwise preference procedure described above. Test panels consisted of 20 members. Only one salt-C mixture was evaluated on each test date. The results of these studies are summarized in Table 1 below.

TABLE 1

Preference for peas with topically-applied Choline Chloride
(control = 0.5% salt)

| % Salt | % C | Total % Additive | Preference Test | Preference Control | Hedonic Rating Test | Hedonic Rating Control |
|---|---|---|---|---|---|---|
| 0.37 | 0.13 | 0.50 | 11.5 | 8.5 | 7.13 | 6.70 |
| 0.42 | 0.08 | 0.50 | 12.5 | 7.5 | 6.58 | 6.28 |
| 0.50 | 0.17 | 0.67 | 11.0 | 9.0 | 6.68 | 6.63 |

The results of this experiment are important for several reasons. First, the data show that C is effective in enhancing saltiness when applied topically. All 3 salt-C mixtures were judged superior to the control in terms of preference and hedonic rating. The success of topical C significantly broadens the potential commercial applications of this product. Second, the results of these experiments demonstrate that C can be used to reduce the salt content of foods without any loss in saltiness. In this study, the replacement of 16–26% of the salt by C actually improved the preference for and hedonic rating of the test sample. Thus, C can be used to improve the flavor of low Na+ products (like the tomato soup) and to reduce the salt content of higher salt foods with no loss in flavor (like the peas). Finally, the positive results of human taste testing in a third test medium further support the use of the animal model to identify novel salt enhancing substances.

5.3 RESULTS ON AMILORIDE DERIVATIVES USING THE ANIMAL MODEL

Extensive structure-activity studies of amiloride and its derivatives have established the selectivity of these compounds for several sodium transport mechanisms (Kleyman, T. R. and Cragoe, E. J., Jr. "Amiloride and its analogs as tools in the study of ion transport." *J. Membr. Biol.* 105:1–21, 1988). Compounds were also evaluated that have been reported to modulate the chloride channel (Landry, D. W., Reitman, M., Cragoe, E. J., Jr. and Al-Awqati, Q. "Epithelial chloride channel: Development of inhibitory ligands." *J. Gen. Physiol.* 90:779–798, 1987).

5.3.1. RESULTS ON AMILORIDE AND BENZAMIL

Amiloride (3,5-diamino-N-aminoiminomethyl-6-chloro-pyrazinecarboxamide) hydrochloride and benzamil (3,5-diamino-[amino-(benzylamino)methylene]-6-chloro-pyrazinecarboxamide) hydrochloride were evaluated as salt substitutes and enhancers. Amiloride and its derivatives substituted with hydrophobic groups on the terminal nitrogen atom of the guanidino moiety (such as benzamil) have been shown to be potent inhibitors of sodium channels in apical epithelial plasma membranes (Kleyman, T. R. and Cragoe, E. J., Jr. "Amiloride and its analogs as tools in the study of ion transport." *J. Membr. Biol.* 105:1–21, 1988). The guanidino-substituted amiloride derivatives have been shown to selectively inhibit sodium channels relative to other sodium transport mechanisms (i.e., Na+/H+ exchange, Na+/Ca++ exchange) (Kleyman, T. R. and Cragoe, E. J., Jr. "Amiloride and its analogs as tools in the study of ion transport." *J. Membr. Biol.* 105:1–21, 1988). Amiloride ($7.4 \times 10^{-4}$M; 0.02%) was mixed into the test solutions presented to a group of control rats. Testing of higher concentrations of amiloride was prevented by the limited aqueous solubility of this compound. Amiloride did not affect the intake of deionized water (0% NaCl). However, amiloride significantly reduced the intake of a 0.9% NaCl solution (from 25.1±1.1 to 16.7±0.7 ml, p<0.05) in these animals (data not shown). In similar experiments, amiloride also significantly reduced the intake of a 0.9% NaCl solution in DOCA-injected rats, showing that DOCA-treated rats respond similarly to control rats with respect to the administration of relatively high doses of amiloride (data not shown). When a much lower concentration of amiloride ($1.13 \times 10^{-5}$M; 0.0003%) was tested, this compound had a greater effect in DOCA-injected rats than in control animals (FIG. 11). Whereas this dose of amiloride had no effect on the intake of a 0.1% NaCl solution in control animals, it significantly reduced (p<0.05) the intake of a 0.1% NaCl solution in DOCA-injected rats. The intake of 0.1% NaCl was reduced to a level similar to that of control animals under the same conditions. The greater effect of low doses of amiloride in DOCA-injected than in control animals may be due to the greater basal intake of 0.1% NaCl by these animals. Benzamil produced similar effects (at a similar dose) to those of amiloride in control and DOCA-injected rats (FIG. 12). Benzamil ($1.12 \times 10^{-5}$M; 0.0004%) had no effect on the intake of a 0.05% NaCl solution by control rats, while significantly reducing (p<0.05) the intake of this solution in DOCA-injected rats. Neither amiloride nor benzamil alone were recognized as salty by control or DOCA-injected rats at the concentrations tested. Thus, amiloride and benzamil reduced the intake of standard salt solutions, particularly in DOCA-injected rats, presumably through the blockade of sodium channels in the lingual epithelium.

5.3.2. RESULTS ON 5-AMINO DERIVATIVES OF AMILORIDE

Two 5-amino derivatives of amiloride (3-amino-N-aminoiminomethyl-5-dimethylamino-6-chloro-pyrazinecarboxamide hydrochloride (5-(N,N-dimethyl)-amiloride) and 3-amino-N-aminoiminomethyl-5-(hexahydro-1H-azepin-1-yl)-6-chloro-pyrazinecarboxamide (5-(N,N-hexamethylene)-amiloride)) were evaluated as salt substitutes and enhancers. Although these compounds are derivatives of amiloride, they have been reported to be more potent as inhibitors of $Na^+/H^+$ exchange than as inhibitors of epithelial sodium channels (Kleyman, T. R. and Cragoe, E. J., Jr. "Amiloride and its analogs as tools in the study of ion transport." *J. Membr. Biol.* 105:1-21, 1988) In general, amiloride analogs with one or two substituents on the 5-amino nitrogen show a substantial loss of inhibitory activity at sodium channels and an increase in inhibitory activity at the $Na^+/H^+$ transporter in vitro. Id. In vivo, 5-amino derivatives of amiloride have been found to be ineffective in inhibiting the electrophysiological response to lingual NaCl application in the gerbil (Schiffman, S. S., Frey, A. E., Suggs, M. S., Cragoe, E. J., Jr. and Erickson, R. P. "The effect of amiloride analogs on taste responses in gerbils." *Physiol. Behav.* 47:435-441, 1990. Moreover, these compounds have also been found to lose diuretic potency (relative to amiloride) in the saline-loaded, adrenalectomized and DOCA-treated rat (Cragoe, E. J., Jr. Diuretic pyrazines. In: Diuretics: Chemistry, Pharmacology and Medicine, ed. by E. J. Cragoe, Jr., pp. 303-343, John Wiley & Sons, New York, 1983).

In contrast to amiloride and its guanidino-substituted derivative benzamil, 5-(N,N-dimethyl)-amiloride and 5-(N,N-hexamethylene)-amiloride enhanced the intake of NaCl solutions, particularly in DOCA-injected rats. Concentrations of 0.0001% ($3.4 \times 10^{-6}$M) to 0.001% ($3.4 \times 10^{-5}$M) 5-(N,N-dimethyl)-amiloride increased the intake of a 0.05% NaCl solution; these increases were statistically-significant (p<0.05) in DOCA-injected rats (FIG. 13). A concentration of 0.0003% ($1.0 \times 10^{-5}$M) 5-(N,N-dimethyl)-amiloride was found to be the most effective in enhancing the intake of 0.05% NaCl in these animals. This compound alone did not serve as a salt substitute and had little effect on basal fluid intake in these experiments (data not shown). Similar concentrations of 5-(N,N-hexamethylene)-amiloride (0.0001% ($3.2 \times 10^{-6}$M)−0.001% ($3.2 \times 10^{-5}$M)) also enhanced the intake of a 0.05% NaCl solutions (FIG. 14). This compound also significantly increased the intake of 0.1% and 0.9% NaCl solutions in DOCA-injected rats; the changes in intake in control rats did not reach statistical significance (data not shown). As with the 5-(N,N-dimethyl)-derivative, the 5-(N,N-hexamethylene)-derivative of amiloride failed to serve as a salt substitute at the concentrations tested (data not shown).

Thus, consistent with in vitro ion transport experiments (Kleyman, T. R. and Cragoe, E. J., Jr. "Amiloride and its analogs as tools in the study of ion transport." *J. Membr. Biol.* 105:1-21, 1988) and in vivo electrophysiological experiments (Schiffman, S. S., Frey, A. E., Suggs, M. S., Cragoe, E. J., Jr. and Erickson, R. P. "The effect of amiloride analogs on taste responses in gerbils." *Physiol. Behav.* 47:435-441, 1990), the amiloride derivatives modified at the 5-amino nitrogen behaved quite differently in the present model than those derivatives modified at the guanidino moiety. Because electrophysiological studies have shown that 5-amino-modified amiloride derivatives fail to enhance the NaCl signal recorded from the chorda tympani of the gerbil (Id.), the observations made in the present experiments suggest that the enhanced intake of NaCl solutions produced by these compounds may be due to mechanisms other than those mediated through the chorda tympani. Alternately, species differences between the rat and gerbil may account for some of the observed effects. Regardless of the mechanistic reasons for the enhancement of NaCl intake by 5-(N,N-dimethyl)- and 5-(N,N-hexamethylene)- derivatives of amiloride, the DOCA model predicts that these two compounds will be effective as salt enhancers in man. Furthermore, it would predict that these compounds would be approximately 1500 to 4600 times more potent (on a molar basis) than choline chloride as salt enhancers. Based on the results above, it is also reasonable to expect that all 5-amino-modified amiloride derivatives that show selectivity for the $Na^+/H^+$ exchanger over $Na^+$ channels are likely to serve as salt taste enhancers in the DOCA-model and in man. Differences in chemical structure of the 5-amino substituents are likely to affect solubility, pharmacokinetic parameters and side-effect profiles.

Amiloride derivatives which are expected to behave as salt substitutes or salt enhancers are represented by the following formula:

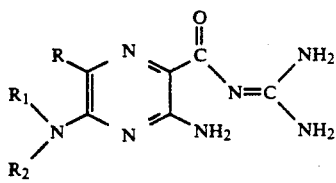

where R selected from the group consisting of F—, Cl— (preferred), Br—, I—; $R_1$ is selected from the group consisting of hydrogen, linear or branched alkyl, alkoxy, aminoalkyl, amino, cycloalkyl, aralky and aryl, optionally substituted with one or more groups selected from the group consisting of halogen, amino, nitro, sulfhydryl, hydroxy, alkyl and alkoxy; and $R_2$ is selected from the group consisting of hydrogen, linear or branched alkyl, alkoxy, aminoalkyl, amino, cycloalkyl, aralkyl or aryl, optionally substituted with one or more groups selected from the group consisting of halogen, amino, nitro, sulfhydryl, hydroxy, alkyl and alkoxy except that $R_2$ may not be hydrogen when $R_1$ is hydrogen.

Compounds of the structure described should show selectivity for affecting $Na^+/H^+$ exchange preferentially over (at lower concentrations than) $Na^+$ channels. This selectivity is defined relative to the parent compound amiloride (R=Cl, R1=H, R2=H), as described in Kleyman, T. R. and Cragoe, E. J., Jr. "Amiloride and its analogs as tools in the study of ion transport." J. Membr. Biol. 105:1–21, 1988.

Two examples of amiloride derivatives which function as salt flavor enhancers are 5-N,N-(dimethyl)-amiloride (R=Cl; $R_1$, $R_2$=methyl in the above chemical formula for amiloride species; refer to data in FIG. 15) and 5-N,N-(hexamethylene)-amiloride (R=Cl; $R_1$, $R_2$=hexamethylene in the above formula; refer to data in FIG. 14).

The amiloride derivatives are expected to be effective in enhancing saltiness in compositions having ratio of sodium chloride to amiloride derivative of between 5:1 and 1:100, and between 10,000:1 and 1:1, preferably between 5,000:1 to 5:1.

5.4 RESULTS ON INDANYLOXYACETIC ACID DERIVATIVES

Chloride channels are present in most epithelial cells where they modulate the absorption or secretion of NaCl (Landry, D. W., Reitman, M., Cragoe, E. J., Jr. and Al-Awqati, Q. "Epithelial chloride channel: Development of inhibitory ligands". J. Gen. Physiol. 90:779–798, 1987). A number of compounds have been found to inhibit the movement of chloride ions (Cl) through these channels in vitro (Id.). One of these compounds, R(+)-IAA-94 (R(+)-[(6,7-dichloro-2-cyclopentyl-2,3-dihydro-2-methyl-1-oxo-1H-inden-5-yl)-oxy]acetic acid), was evaluated as a potential salt enhancer or substitute in the present model. Like the 5-amino-modified amiloride derivatives, R(+)-IAA-94 enhanced NaCl intake at relatively low concentrations. As little as 0.0001% ($2.8 \times 10^{-6}$M) R(+)-IAA-94 significantly enhanced the intake of 0.05% NaCl in DOCA-injected rats (FIG. 15). This compound was not effective alone as a salt substitute (data not shown) The activity of R(+)-IAA-94 in this assay suggests that this compound is likely to function as a salt enhancer in man. Moreover, it may be over 5,000 times more potent as a salt enhancer (on a molar basis) than choline chloride.

Other indanyloxyacetic acids, that are potent and selective inhibitors of Cl transport (defined in vitro) can reasonably be expected to have salt enhancing properties similar to that of R(+)-IAA-94.

These would include compounds of the following formula:

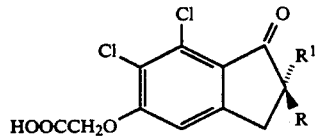

where R is selected from the group consisting of hydrogen, linear or branched alkyl, alkoxy, aminoalkyl, amino, cycloalkyl, aralkyl and aryl, with R optionally substituted with one or more groups selected from the group consisting of halogen, amino, nitro, sulfhydryl, hydroxy and alkoxy; and $R_1$ is selected from the group consisting of hydrogen, linear or branched alkyl, alkoxy, aminoalkyl, amino, cycloalkyl, aralkyl and aryl, with R1 optionally substituted with one or more groups selected from the group consisting of halogen, amino, nitro, sulfhydryl, hydroxy, alkyl and alkoxy.

Active isomers of these compounds may be either levorotatory or dextrorotatory.

Compounds of the structure described should show selectivity for affecting epithelical chloride channels as described in Landry, D. W., Reitman, M., Cragoe, E. J., Jr. and Al-Awqati, Q. "Epithelial chloride channel: Development of inhibitory ligands." J. Gen. Physiol. 90:779–798, 1987.

The indanylxyacetic acid derivatives in general are expected to be effective in enhancing saltiness in compositions having ration of sodiumchloride to indanyloxyacetic acid derivative of between 10,000:1 and 1:1, preferably between 5,000:1 and 5:1.

One example of indanyloxyacetic acid derivative which functions as a salt flavor enhancer is R(+)-indanoyloxyacetic acid 94 (R=methyl; $R_1$=cyclopentyl in the above formula; see data in FIG. 15).

The indanyloxyacetic acid derivatives in general are expected to be effective in enhancing saltiness in compositions having ratio of sodium chloride to indanyloxyacetic acid derivative of between 10,000:1 and 1:1, preferably between 5,000:1 and 5:1.

5.5 RESULTS ON ANTHRANILIC ACID DERIVATIVES

By analogy to the results on R(+)-IAA-94, anthranilic acid derivatives (Id.) that are potent and selective inhibitors of Cl transport (defined in vitro) can be expected to have salt enhancing properties similar to that of R(+)-IAA-94.

These would include compounds of the following formula:

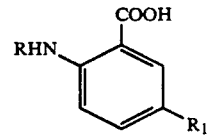

where R is selected from the group consisting of linear or branched alkyl, alkoxy, aminoalkyl, amino, cycloalkyl, aralkyl and aryl, with R optionally substituted with one or more groups selected from the group consisting of halogen, amino, nitro, sulfhydryl, hydroxy and alkoxy; and $R_1$ is selected from the group consisting of hydrogen, halogen, amino, nitro, sulfhydryl, hydroxy, linear or branched alkyl and linear or branched alkoxy.

Compounds of the structure described should show selectivety for affecting epithelial chloride channels as described in Landry, D. W., Reitman, M., Cragoe, E. J., Jr. and Al-Awqati, Q. "Epithelial chloride channel: Development of inhibitory ligands." *J. Gen. Physiol,* 90:779–798, 1987.

One example of an anthranilic acid derivative which should function as a salt flavor enhancer is N-(propylphenyl)-5-nitroanthranilic acid (R=propylphenyl; $R_1$=nitro in the formula above).

The anthranilic acid derivatives in general are expected to be effective in enhancing saltiness in compositions having ratio of sodium chloride to anthranilic acid derivative of between 10,000:1 and 1:1, preferably between 5,000:1 and 5:1.

It is apparent that many modifications and variations of this invention may be made without departing from the spirit and scope thereof. The specific embodiments described are given by way of example only and the invention is limited only by the terms of the appended claims.

A number of references are cited in the present specification, the entire disclosure of each of which is incorporated by reference herein, in its entirety.

What is claimed is:

1. A composition for imparting saltiness to, or enhancing the saltiness of, edible materials comprising an effective amount of sodium chloride and an amiloride derivative of the following formula:

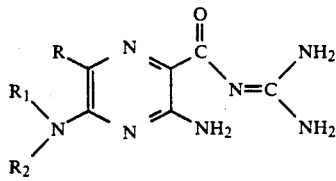

where R is selected from the group consisting of F—, Cl— Br— and I—;

$R_1$ is selected from the group consisting of hydrogen, linear or branched alkyl, alkoxy, aminoalkyl, amino, cycloalklyl, aralky and aryl, with $R_1$ optionally substituted with one or more groups selected from the group consisting of halogen, amino, nitro, sulfhydryl, hydroxy, alkyl and alkoxy; and $R_2$ is selected from the group consisting of hydrogen, linear or branched alkyl, alkoxy, aminoalkyl, amino, cycloalkyl, aralkyl and aryl, with $R_2$ optionally substituted with one or more groups selected from the group consisting of halogen, amino, nitro, sulfhydryl, hydroxy, alkyl and alkoxy, except that $R_2$ may not be hydrogen when $R_1$ is hydrogen.

2. The composition according to claim 1, wherein the amiloride derivative is 5-N,N-(dimethyl)-amiloride (R=Cl; $R_1$=methyl; $R_2$=methyl in the formula of claim 1).

3. The composition according to claim 1, wherein the amiloride derivative is 5-N,N-(hexamethylene)-amiloride (R=Cl; $R_1$, $R_2$=hexamethylene in the formula of claim 1).

4. The composition according to claims 1, 2 or 3, wherein the ratio of sodium chloride to the amiloride derivative is between 10,000:1 and 1:1.

5. The composition according to claims 1, 2 or 3, wherein the ratio of sodium chloride to the amiloride derivative is between 5,000:1 to 5:1.

6. A method for imparting saltiness to, or enhancing the saltiness of, edible materials which comprises adding to the edible material, in an amount which will afford the degree of saltiness desired, a composition containing an effective amount of sodium chloride and an amiloride derivative of the following formula:

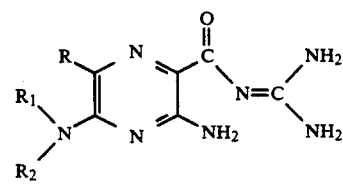

where R is selected from the group consisting of F—, Cl—, Br—, and I—;

$R_1$ is selected from the group consisting of hydrogen, linear or branched alkyl, alkoxy, aminoalkyl, amino, cycloalklyl, aralky and aryl, with $R_1$ optionally substituted with one or more groups selected from the group consisting of halogen, amino, nitro, sulfhydryl, hydroxy, alkyl and alkoxy; and $R_2$ is selected from the group consisting of hydrogen, linear or branched alkyl, alkoxy, aminoalkyl, amino, cycloalkyl, aralkyl and aryl, with $R_2$ optionally substituted with one or more groups selected from the group consisting of halogen, amino, nitro, sulfhydryl, hydroxy, alkyl and alkoxy, except that $R_2$ may not be hydrogen when $R_1$ is hydrogen.

7. The method according to claim 6, wherein the amiloride derivative is 5-N,N-(dimethyl)-amiloride (R=Cl; $R_1$=methyl; $R_2$=methyl in the formula of claim 6).

8. The method according to claim 6, wherein the amiloride derivative is 5-N,N-(hexamethylene)-amiloride (R=Cl; $R_1$, $R_2$=hexamethylene in the formula of claim 6).

9. The method according to claims 6, 7 or 8, wherein the ratio of sodium chloride to amiloride derivative is between about 5:1 and 1:100.

10. The method according to claims 6, 7, or 8, wherein the ratio of sodium chloride to amiloride derivative is between about 5,000:1 to 5:1.

11. A method for enhancing the saltiness of edible materials containing sodium chloride which comprises adding to the edible material, in an amount which will afford the degree of saltiness desired, an amiloride compound of the following formula:

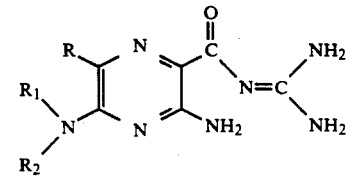

where R is selected from the group consisting of F—, Cl—, Br— and I—;

$R_1$ is selected from the group consisting of hydrogen, linear or branched alkyl, alkoxy, aminoalkyl, amino, cycloalklyl, aralky and aryl, with $R_1$ optionally substituted with one or more groups selected from the group consisting of halogen, amino, nitro, sulfhydryl, hydroxy, alkyl and alkoxy; and $R_2$ is selected from the group consisting of hydrogen, linear or branched alkyl, alkoxy, aminoalkyl, amino, cycloalkyl, aralkyl and aryl, with $R_2$ optionally substituted with one or more groups selected from the group consisting of halogen, amino, nitro, sulfhydryl, hydroxy, alkyl and alkoxy, except that $R_2$ may not be hydrogen when $R_1$ is hydrogen.

12. The method according to claim 11, wherein the amiloride derivative is 5-N,N-(dimethyl)-amiloride (R=Cl; $R_1$=methyl; $R_2$=methyl in the formula of claim 11).

13. The method according to claim 11, wherein the amiloride derivative is 5-N,N-(hexamethylene)-amiloride (R=Cl; $R_1$, $R_2$=hexamethylene in the formula of claim 11).

14. The method according to claims 11, 12 or 13, wherein the ratio of sodium chloride to amiloride derivative is between about 10,000:1 and 1:1.

15. The method according to claims 11, 12, or 13, wherein the ratio of sodium chloride to amiloride derivative is between about 5,000:1 and 5:1.

* * * * *